US012056275B2

(12) United States Patent
Miller et al.

(10) Patent No.: US 12,056,275 B2
(45) Date of Patent: Aug. 6, 2024

(54) METHOD AND A SYSTEM FOR INTERACTING WITH PHYSICAL DEVICES VIA AN ARTIFICIAL-REALITY DEVICE

(71) Applicant: Meta Platforms Technologies, LLC, Menlo Park, CA (US)

(72) Inventors: Daniel Miller, Twickenham (GB); Renzo De Nardi, Seattle, WA (US); Richard Andrew Newcombe, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/048,411

(22) Filed: Oct. 20, 2022

(65) Prior Publication Data

US 2023/0130770 A1    Apr. 27, 2023

Related U.S. Application Data

(60) Provisional application No. 63/271,804, filed on Oct. 26, 2021.

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0101* (2013.01);
(Continued)

(58) Field of Classification Search
CPC ...... G06F 3/013; G06F 3/017; G06F 3/04815; G06F 3/04842; G06F 3/04845;
(Continued)

(56) References Cited

U.S. PATENT DOCUMENTS

| 2017/0061694 A1 | 3/2017 | Giraldi et al. |
| 2017/0123491 A1 | 5/2017 | Hansen et al. |

(Continued)

OTHER PUBLICATIONS

International Search Report and Written Opinion for International Application No. PCT/US2022/047825, mailed Feb. 8, 2023, 9 pages.

*Primary Examiner* — Abhishek Sarma
(74) *Attorney, Agent, or Firm* — Morgan, Lewis & Bockius LLP

(57) ABSTRACT

An Artificial Reality (AR) device captures an image of a physical environment surrounding a user wearing the AR device. A three-dimensional map corresponding to the physical environment is accessed. Then, a pose of the AR device relative to the three-dimensional map is determined based on first features of physical objects captured in the image and second features of object representations in the three-dimensional map. The device determines, using an eye tracker, a gaze of an eye of the user. Based on the gaze and the pose, a region of interest is computed in the three-dimensional map. Representations of physical devices in the region of interest of the three-dimensional map are identified. The device determines an intent of the user to interact with a physical device. A command is issued to the physical device based on the determined intent.

20 Claims, 11 Drawing Sheets

(51) Int. Cl.
*G02B 27/01* (2006.01)
*G06N 20/00* (2019.01)
*G06V 10/25* (2022.01)
*G06V 20/20* (2022.01)
*G06V 40/18* (2022.01)

(52) U.S. Cl.
CPC .......... *G02B 27/017* (2013.01); *G06N 20/00* (2019.01); *G06V 10/25* (2022.01); *G06V 20/20* (2022.01); *G06V 40/18* (2022.01); *G02B 2027/014* (2013.01); *G02B 2027/0178* (2013.01)

(58) Field of Classification Search
CPC . G06F 3/011; G02B 27/0093; G02B 27/0101; G02B 2027/014; G02B 2027/0178; G02B 27/017; G06N 20/00; G06V 10/25; G06V 20/20; G06V 40/18
See application file for complete search history.

(56) References Cited

U.S. PATENT DOCUMENTS

2018/0349012 A1 12/2018 Hill et al.
2020/0225747 A1 7/2020 Bar-Zeev et al.

METHOD AND A SYSTEM FOR INTERACTING WITH PHYSICAL DEVICES VIA AN ARTIFICIAL-REALITY DEVICE

PRIORITY

This application claims the benefit under 35 U.S.C. § 119(e) of U.S. Provisional Patent Application No. 63/271,804, filed 26 Oct. 2021, which is incorporated herein by reference.

TECHNICAL FIELD

This disclosure generally relates to an artificial-reality (AR) system capable of representing a physical environment in a three-dimensional (3D) map for identifying physical devices/objects in the three-dimensional map and enabling an intent of a user to interact with the physical devices using eye-tracking and eye-gazing techniques.

BACKGROUND

Artificial reality is a form of reality that has been adjusted in some manner before presentation to one or more viewers, which may include, e.g., virtual reality (VR), augmented reality, mixed reality (MR), hybrid reality, or some combination and/or derivatives thereof. Artificial Reality is a technology belonging to one of the fields of the virtual reality. It combines a virtual environment with a real environment that a viewer feels in a sense and feels as if a virtual environment exists in the original real environment by using a computer technique. This artificial reality is advantageous in that it can supplement additional information that is difficult to obtain only in the real world by synthesizing virtual objects on the basis of the real-world, unlike the existing virtual reality which only targets virtual space and objects. Specifically, some or all of the real objects the viewer sees and interacts with within the real-world environment are simulated by a computing system such as a head-mounted display (HMD) device, a mobile device, a projection system, or another computing device.

Typically, each real object in the real-world environment that is viewable and interacted with by viewers is represented in a three-dimensional (3D) map by the computing device, for example, the HMD device, and each object is represented as a "virtual object" in the 3D map. In such a way, the viewer is enabled to interact with each real object with the same experience as they experience during interacting within the real-world environment. Each virtual object is accessible in the 3D map and the viewers are enabled to interact with the virtual objects by using various interactive interfaces, including controllers, voice interaction/command, mouse devices, keyboard/keypad devices, laser pointing devices, keyboard, game controller, joystick, stylus, speaker, and steering wheel and/or gestures, etc. For example, the viewers can perform various interactive actions with the virtual objects that may include selecting, moving, rotating, resizing, actuating controls, changing colors or skins, defining interactions between real or virtual objects, setting virtual forces to act on virtual objects, or any other action on or change to an object that a viewer can imagine. In some systems, a user can also interact with the real objects that exist independent of the computer system controlling the artificial reality environment. For example, the viewer can select a real object and add a virtual overlay to change the object's color or some other way the object is presented to the user, causing it to affect other virtual objects, etc. As used herein, unless otherwise specified, an "object" can be a real or virtual object.

Conventionally, there are ways to access and interact with the virtual objects. One of the ways is to use any of the interactive interfaces, for example, the controller to particularly point at a particular object in the simulated environment and select a particular interactive action to perform on the particular selected object. This way requires the viewers to connect the controllers all the time with the computing device i.e., with the HMD, and thus encompasses cumbersome operations to maintain the connectivity with the HMD for performing complex interactive operations.

Another way to access and interact with the virtual objects is by identifying a particular object, for example, a smart device by its associated identification name (ID). Typically, in the real-world environment, each object such as smart devices, smart appliances, smart bulbs, etc., that are part of a smart home platform, forming the internet-of-things, is required to be associated with a different identification name that is different from other devices' identification names. For example, consider the smart home platform consisting of 3 smart bulbs and 2 smart plugs and each associated with a unique ID connected over a network. One more intuitive way to identify the 3 smart bulbs and 2 smart plugs other than their associated IDs is with a product ID or unique nickname e.g., "downstair light", "living" on, or "room 1" dim, etc. Once the nickname is assigned, each nickname of the device is static along with the location of the device. In the same example, if one of the smart plugs is removed from downstairs and replaced in a socket upstairs, then the smart plug still retains the nickname the "downstairs light". This involves a difficult task for the viewers or users to interact with IoT devices in their environment because its cumbersome to remember each identification or nickname perfectly with the exact syllables and in such a scenario user's commands might not clearly identify which one of the IoT devices or objects are of interest to the user at the moment. Additionally, the viewers/users are required to remember the location of each device, for example, where each device is mounted or situated at the moment. Therefore, there is a need for a system and method for identifying physical objects using eye tracking and eye gazing techniques in combination with object identification through a 3D object-centric map of the environment for interacting with the physical objects eliminating the need of using their IDs or nicknames.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY OF PARTICULAR EMBODIMENTS

Embodiments of the disclosure provide Artificial Reality (AR) devices that enable determining intents of users to interact with physical devices in the physical environment. The users wearing any of the AR devices, for example, head-mounted display device (HMD), electromyographic wearable device (EMG), head-up display device (HUD), smart glasses with AR features, etc., capture live streams and images of a physical environment dynamically in real-time that are converted into three-dimensional (3D) map, for example, three-dimensional object-centric map representation. Using the 3D object-centric map representation, a location of a user in a particular area or region of interest of the physical environment is detected and the detection of the location of the user depends on determining of 6 Degrees of Freedom (DOF) poses of the AR device in the three-dimensional map. The 6 DOF of poses of the AR device is detectable based upon identification of all physical objects that are in line-of-sight of the user in the particular area or region of interest detected for the user. For example, after localizing the user in the physical environment in terms of the different poses of the AR device, one or more physical objects, for example, smart objects with smart features, including but not limited to, smart television, smart light bulb, LEDs, and other particular physical objects other than the smart devices like chairs, tables, couches, side tables, etc., are detected. Each physical object existing in the physical environment is identified by evaluating various physical and semantic features including surface attributes and data points of each physical object. The evaluation of the various physical, and semantic features, surface attributes, and data points associated with each physical object, an object representation is generated for each of those physical objects in the three-dimensional map. The object representation includes object vectors, a bounding box, and pixel-perfect in the three-dimensional map as a non-limiting embodiment. When the user, using any of the AR devices, provides an instruction associated with a likelihood of an intent to interact with any of the objects in the physical environment through the three-dimensional map access, a gaze of an eye at a particular object is determined. The eye gaze determines the region of interest for the user in real-time which identifies the physical devices that the user is looking at. The intent of the user to interact with the physical devices is determined on the basis of the instructions received from the user and contextual signals, for example, time of the day, previously stored historical data, previously determined intent, past user behavior, other pre-stored user intents, predictive intents corresponding to the physical devices. In this way, the user is interfaced with that particular object or device using world-locked eye gaze and eye tracking techniques without having to reference that particular device by its nickname or ID overcoming the drawbacks of the conventional methods. Further, the user can control and interact with any of the physical objects or devices dynamically in real-time in a more intuitive way without the requirement of using the object's or device's IDs or nicknames, or location data. Interfacing the user with the physical objects or devices through the 3D representation and through eye gazing techniques, enables the user to perform any kind of user command, for example, head gesture, hand gesture, voice gesture, finger taps, drag and drop movement, finger pinching, rotating movement, bloom gesture, resizing, selecting, moving, a natural language query, and any other kinds of AR-related commands. For example, a TV unit and a smart plug may be in the same direction as the user's gaze. Despite both the TV and the smart plug is in the same direction, the smart plug alone is determined to be interacted with by the user intent using speech-to-text recognition. For example, only the words "Turn On" is acted upon in reference to the smart plug, without having to refer to the smart plug by its ID or nickname by the voice in the speech-to-text recognition, because eye tracking and eye gaze are detected to be at that smart plug instead of the TV unit. In this scenario, the user is may have a different effect if the user is observing or eye gazing at a smart plug, when compared with if they are observing the TV, despite not referencing those objects directly by voice.

Particular embodiments, disclose a machine learning model stored in a data repository of a computing system. The machine learning model is trained with an updated output of the commands resulting from interacting with the physical devices or objects using the eye gazing technique. In particular, the output of various previous interactions of the user with various physical objects or devices, that occurred in the past is used as training data for training machine learning models. In this way, the machine learning model improves efficiency in predicting kinds of user intents for interacting with the physical objects or devices, kinds of commands detected based on previously issued commands of the user in the past, and based on other factors such as time of the day the user has interacted before or the user is likely to interact in present time, user behavior learned from previous actions or intents, or predicting user behavior in the present time, current state and historical state of both the user and the physical objects and/or devices, historical context semantics of the user intent for interaction, weather forecast information in the present time, past time or for the future time, default settings set for each physical object or device, priority scores associated with each physical object and/or device, number of times of each of the factors stated above, and other related factors that are specific for interacting with various physical objects and/or devices. The machine learning model is trained using the resulting output of each interaction of the user along with maintaining the three-dimensional map of each region of the physical environment. Additionally, the machine learning model is updated with the input of the user as well. In this way, the trained machine learning model helps in reducing the potential for latency and performance issues while providing a quick and accurate response to each user intent in the present time or for the future time predicted accurately over time for interacting with various physical objects and/or devices.

Particular embodiments, disclose a distributed networking system comprising a computing system associated with the AR device and several Internet of things (IoT) devices. The computing system communicates with AR devices, IoT devices, and other physical devices over a network environment enabling the user to control and interact with various physical devices. The computing system can utilize the three-dimensional map, eye gazing technique in combination with utilizing the machine learning model to enable the user to access dynamic information including physical, context, and semantic information of all the physical objects or devices in addition to issuing commands for interaction. This way, the computing system enhances the AR experience for the user via the usage of the AR device and the computing system via the networking environment.

Particular embodiments, disclose a process for interacting with physical objects and/or devices based on determining 1) a location of the user in the present time, 2) objects and/or devices present in a region of the physical environment around or proximal to the location of the user in the present time, 3) current state of both the user and objects and/or devices around or proximal to the location of the user. When users of artificial reality systems traverse throughout the physical environment, for example by moving throughout rooms or areas or floors or zones of a particular environment or house or building, etc., artificial reality systems must provide synchronized, continuous, and updated feature maps with low latency in order to provide a high quality, immersive, quick, seamless and enjoyable experience for users in accessing the three-dimensional map for the area as the user enter them while reducing the potential for latency and performance issues required for the interaction. In particular, the process includes receiving live streams of images of the physical environment the user is entering or present in. A three-dimensional map is generated for a current region of interest where the user is located or where the user is in proximity to the current region of interest. The three-dimensional map can be stored locally (e.g., on the user-related devices) or in the computing system, through the cloud or hub, or any of the devices connected via the networking environment. Based on the three-dimensional map and location of the user, one or more representations of the physical devices are localized and identified. In particular, the physical objects in a field of view with respect to the location user are identified and represented as the one or more representations in the three-dimensional map. The intent of the user is determined for providing interaction with one or more physical devices in real-time dynamically based on the detected location of the user in the current region of interest. The intent of the user is accomplished by using any of the trained machine learning models and/or explicit instructions including commands for interaction from the user and/or pre-set commands for such interaction. Each of the interactions performed in real-time at the present time is updated and stored to retrain the machine learning model and data repository associated with the AR device.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
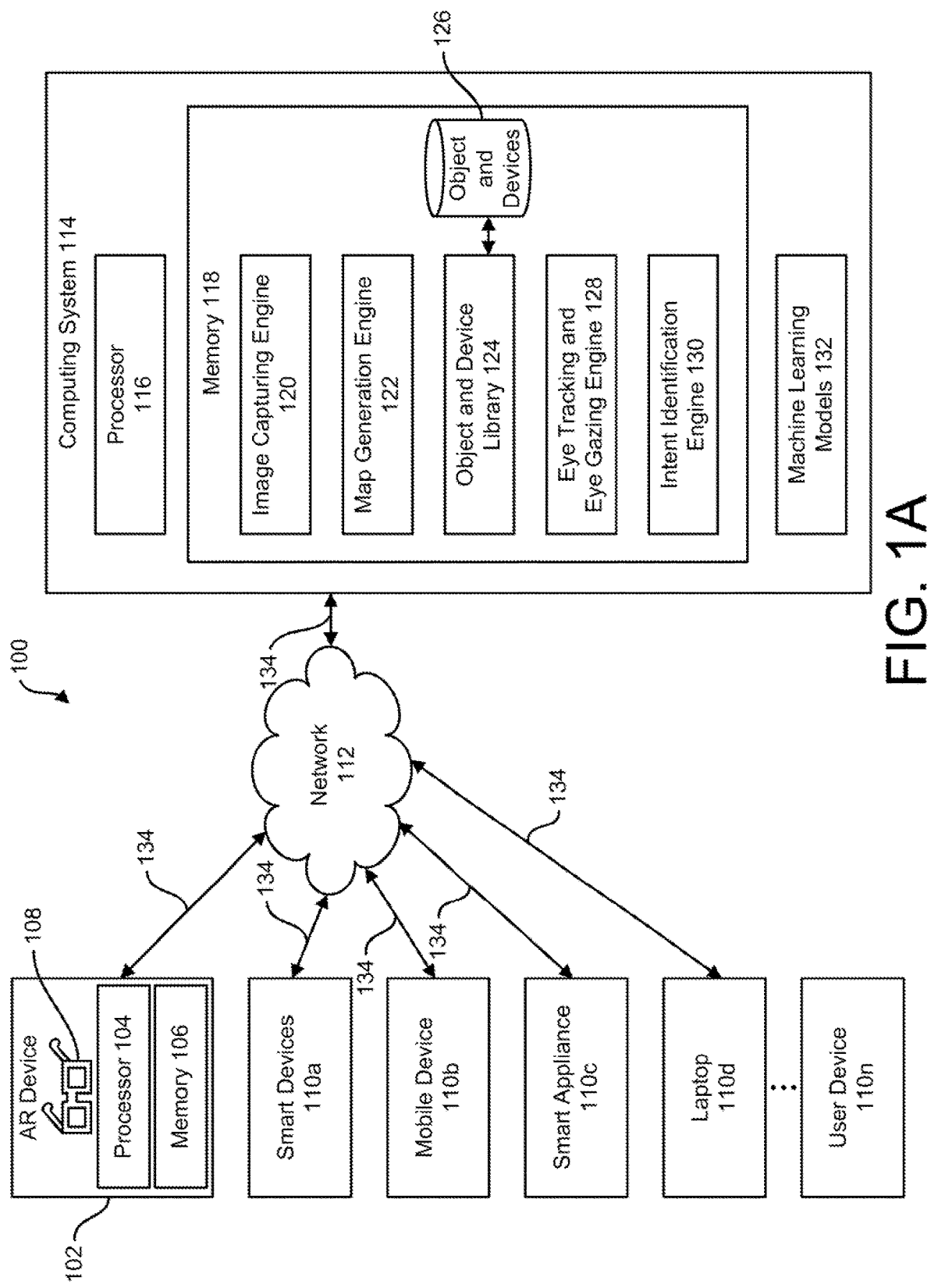
FIG. 1A illustrates a distributed network environment with an artificial reality device (AR), one or more devices, and a computing system with the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

FIG. 1A illustrates a system 100 communicatively connected with an artificial reality (AR) device (AR), one or more devices 110a, 110b, 110c, 110d, . . . , 110n, a communication network 112, and a computing system 114 with the context of use and principal functional elements with which one embodiment could be implemented.

In an embodiment, a system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

In the example of FIG. 1A, a distributed system 100 comprises the artificial reality (AR) device 102, and the one or more devices 110a-110n, that is communicatively coupled to a recommendation system 112 via a data communication network 112. In particular embodiments, the system 100 may be any of electronic systems or electronic devices including hardware, software, or embedded logic components or a combination of two or more such components and capable of carrying out the appropriate functionalities implemented or supported by the system 100. As an example, and not by way of limitation, the system 100 may include a computer system such as a desktop computer, notebook or laptop computer, netbook, tablet computer, e-book reader, GPS device, camera, personal digital assistant (PDA), handheld electronic device, cellular telephone, smartphone, augmented/virtual reality device, mixed reality (MR) device, other suitable electronic devices, or any suitable combination thereof. In an embodiment, the system 100 may comprise one or more processors programmed to implement computer-executable instructions that are stored in one or more memories or memory units, or data repositories of the system 100. In an embodiment, the one or more processors of the system 100 may be configured to implement each and every functionality of the artificial reality (AR) device 102, any of the devices 110a, 110b, . . . , 110n, and the computing system 114. In particular, the one or more processors of the system 100 may be configured to operate any of the artificial reality device 102 including augmented reality device functionalities, virtual reality (VR) device functionalities, mixed reality (MR) device functionalities, that are configured to scan and capture live streams of images and stream sensor data in real-time relating to any of physical environment. The one or more processors of the system 100 may be configured to perform and implement any of the functions and operations relating to representing the physical environment in a form of the virtual environment, carrying out one or more techniques including, but not limited to, simultaneous localizing and mapping (SLAM) techniques, eye tracking and eye gazing techniques, devices or objects tracking operations, multi degrees of freedom (DOF) detecting techniques to determine a pose of the device or a gaze of a user, representing three-dimensional (3D) object-centric map of an environment, etc., for enabling the user in the environment to access and interact with any of the one or more devices 110 (110a, 110b, . . . , 100n) and/or one or more objects different from the one or more devices 110, existing in that environment. In particular embodiments, the system 100 may be further configured to detect the intent of the user to interact with any of the devices or objects in the environment through one or more commands including, but not limited to, any head gesture, hand gesture, voice gesture, finger taps, drag and drop movement, finger pinching, rotating movement, bloom gesture, resizing, selecting, moving, a natural language query or commands, and any other kinds of AR-related commands to interact. In an embodiment, the system 100 may further include a graphical user interface (GUI) or any display unit to enable users for viewing how the users are provided with access and interactions with any of the one or more devices 110 (110a, 110b, . . . , 110n) or the one or more objects that are different from the one or more devices 110, and to view resulting output of implementing such interactions.

In particular embodiments, the system 100 includes links 134 and a data communication network 112 enabling communication and interoperation of each of the artificial reality (AR) device 102, the one or more devices 110a, . . . , 110n, and the computing system 114 with one another enabling the users to access and interaction with any of the one or more devices 110a, . . . , 110n and the one or more objects in the physical environment. In particular embodiments, links 134 may connect each of the artificial reality (AR) device 102, the one or more devices 110a, . . . , 110n, and the computing system 114 with one another to the data communication network 112 or to each other. This disclosure contemplates any suitable links 134. In particular embodiments, one or more links 134 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 134 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 134, or a combination of two or more such links 134. Links 134 need not necessarily be the same throughout the system 100. One or more first links 134 may differ in one or more respects from one or more second links 134.

In particular embodiments, system 100 including the data communication network 112 may include any suitable network 112. As an example and not by way of limitation, one or more portions of network 112 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), Internet or a portion of the Internet, a portion of the Public Switched Telephone Network (PSTN), a cellular telephone network, or a combination of two or more of these. Network 112 may include one or more networks 112. In an embodiment, the data communication network 112 may be implemented by any medium or mechanism that provides for the exchange of data and information to or from each of the AR device 102, the one or more devices 110a, . . . , 110n, and the computing system 114. In an example, the data and information exchange includes, but is not limited to, live streams, live states, and real-time data including three-dimensional (3D) maps, for example, object-centric maps, eye tracking data, eye gazing data, vector data associated with eye tracking and eye gazing data, device, and object identification information, and/or multi DOF (for example 6 DOF) of the poses of the user or the AR device, the one or more instructions of the users and the one or more commands with the intent of accessing and interaction by the users, between the various user computers and systems including the recommendation system 112.

In particular embodiments, the system 100 provides the users to communicate and interact with each of the AR device 102, the one or more devices 110a, ..., 110n, and the computing system 114 for providing access, instructions, and commands to or from any of the AR device 102, the one or more devices 110a, ..., 110, the one or more objects and the computing system 114 through an application programming interfaces (API) or other communication channels. The instructions and the commands of the users for accessing, interacting, and/or operating various devices or objects of the physical environment through the access of a three-dimensional (3D) object-centric map via the AR device 102 may be executed based on the device-specific application protocols and attributes configured for the corresponding devices.

In particular embodiments, the system 100 and each of the AR device 102, the one or more devices 110a, ..., 110n, and the computing system 114, may include a web browser and may have one or more add-ons, plug-ins, or other extensions. A user at the AR device 102, and/or the one or more devices 110a, ..., 110n, and/or the computing system 114 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server or hub. The server may accept the HTTP request and communicate to each of the AR devices 102, the one or more devices 110a, ..., 110n, the computing system 114 and the system 100, one or more Hyper Text Markup Language (HTML) files responsive to the HTTP request. A webpage is rendered based on the HTML files from the server for presentation to the user with the intent of providing access and issuing commands for interaction with the one or more devices 110, ..., 110n including the AR device 102, and the computing system 114. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, the artificial reality (AR) device 102 may be a head-mounted display device (HMD), an electromyographic wearable device (EMG), a head-up display device (HUD), AR glasses (smart glasses), smart-phone AR (mobile AR), tethered AR headsets and any other devices with AR features. Artificial reality AR is a form of reality that has been adjusted in some manner before presentation to a user, which may include, e.g., virtual reality (VR), augmented reality, mixed reality (MR), a hybrid reality, or some combination and/or derivatives thereof. The artificial reality content may include completely generated content or generated content combined with captured content (e.g., real-world photographs or images, or live streams, state). The artificial reality content may include video, audio, haptic feedback, or some combination thereof, any of which may be presented in a single channel or in multiple channels (such as stereo video that produces a three-dimensional effect to the user and/or viewer). The artificial reality may be associated with applications, products, accessories, services, or some combination thereof, that are, e.g., used to create content in artificial reality and/or used in (e.g., perform activities in) an artificial reality. The artificial reality system that provides the artificial reality content may be implemented on various platforms, for example, the head-mounted display (HMD) connected to a host computer system or the computing system 114, a standalone HMD, a smart device 110a, a mobile device 110b, or any of the devices 110a, ..., 110n, or computing system 114, or any other hardware platform capable of providing artificial reality content to one or more users and/or the viewers.

Figure 1B:
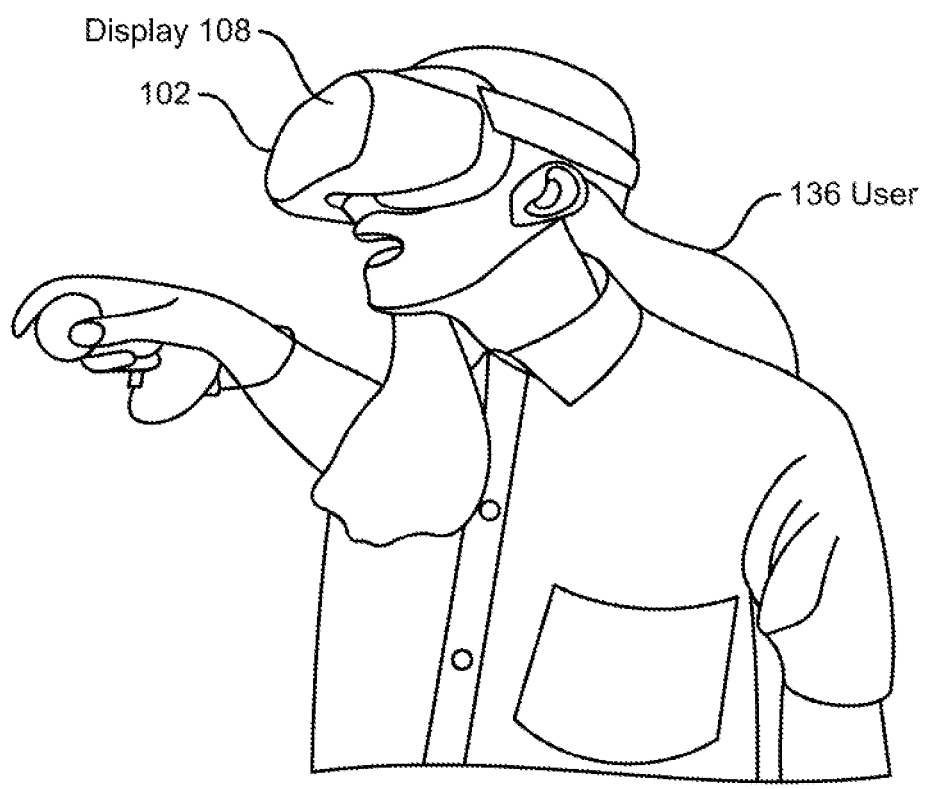
FIG. 1B illustrates an artificial reality (AR) device and a user.

In particular embodiments, the AR device 102 may comprise one or more processors 104, a memory 106 for storing computer-readable instructions to be executed on the one or more processors 104, and a display 108. The memory 106 may also store other types of data to be executed on the one or more processors 104. The AR device 102 may also comprise one or more sensors, object tracking units, eye tracking units, RGB units, simultaneous localizing and mapping (SLAMs) units, inertial measurement units (IMUs), eye gazing units, earphones, Global Positioning System (GPS) receiver, power supply, wired and/or wireless interface, I/O components all in communication with the processors 104 of the AR device 102. In an embodiment, the one or more sensors may include but are not limited to, image sensors, a biometric sensor, a motion and orientation sensor, and a location sensor. The image sensors, for example, cameras may be head worn as shown in FIG. 1B. In a non-limiting embodiment, the image sensors comprising the cameras may include digital still cameras, a digital moving image, or video cameras. The image sensors are configured to capture images or live streams of the physical environment where the user is around and present. In an embodiment, the image sensors capture the images and/or live streams of the physical environment in real-time and provide the user with viewing 3D object-centric map representation of all physical objects as virtual objects or mixed reality objects on the display 108 of the AR device 102 as shown in FIG. 1A. In particular embodiments, the image sensors may include physical space or room-based sensors. For example, the AR device 102 not only draws from users' individual head-mounted displays but also may use a room-based sensor to collect information about rooms, zones, regions, areas, and physical spaces of the physical environment. The space or room-based sensor detects and/or collects information from the physical environment, for example, a space such as a room of an office, living room, media room, kitchen, or other physical space. The image sensor(s) may be in addition to image sensors that form part of the personal AR device worn by the user(s), in one or more embodiments as shown in FIG. 1B. The space or room-based sensor may also include one or more audio sensors or transducers, for example, omnidirectional or directional microphones. The audio sensors or transducers may detect sound from animate objects, for example, one or more users or other people in the ambient physical environment. The audio sensors or transducers may detect sound from inanimate objects, for example, footsteps, televisions, stereo systems, radios, or other appliances. The biometric sensor may include detecting expressions, for example, hand expressions, facial expressions, vocal expressions, body gestures, or eye tracking as well. Further, the biometric sensor may involve measuring bio-signals, for example, blood pressure, heart rate, body temperature, perspiration, or brain waves, identifying a person, including but not limited to, voice recognition, retinal recognition, facial recognition, fingerprint recognition, or electroencephalogram-based recognition, and so forth. The motion and orientation sensor may include an acceleration sensor, for example, an accelerometer, a gravity sensor, a rotation sensor like a gyroscope, and/or the like. The location sensor may include an orientation sensor component (e.g., a Global Positioning System (GPS) receiver), an altitude sensor (e.g., an altimeter or barometer that detects air pressure from which altitude may be derived), an orientation sensor component (e.g., a magnetometer), geolocation sensor to identify the location of the user in a particular zone or region or space of the physical environment and so forth. The one or more sensors may also include, for example, a lighting sensor, for example, a photometer, a temperature sensor, for example, one or more thermometers that detect ambient temperature, a humidity sensor, a pressure sensor like a barometer, acoustic sensor components one or more microphones that detect background noise, proximity sensor components infrared sensors that detect nearby objects, gas sensors e.g., gas detection sensors to detect concentrations of hazardous gases to ensure safety or to measure pollutants in the atmosphere, or other sensors that may provide an indication, measurement, or signal corresponding to the surrounding physical environment. It should be appreciated that only some of the sensors are illustrated, and some embodiments may comprise fewer or greater sensors and/or sub-sensor units, and the illustration should not be seen as limiting.

In particular embodiments, the AR device 102 integrated with real-time object tracking, real-time eye tracking, real-time RGB, real-time simultaneous localizing and mapping (SLAMs) units, real-time inertial measurement units (IMUs), real-time eye gazing enables rendering current real-time visual state of the physical environment or region of interest in the physical environment, for example, visual state of a living area/region of a house. Thus, the AR device 102 enables the user to experience a low friction single-click interface in an artificial reality, such as an EMG wearable device. In an embodiment, each of the physical objects, including one or more devices 110a, . . . , 110n and the one or more objects, exist or present in a region of interest of the physical environment are rendered as virtual reality or mixed reality representations in the 3D object-centric map by the AR device 102. Each of the physical objects, including one or more devices 110a, . . . , 110n, and the one or more objects along with locating a location of the user in the physical environment, is detected by using the SLAM units, IMUs, the eye tracking units, and the eye gazing units of the AR device 102. In an embodiment, each of the physical objects, including one or more devices 110a, . . . , 110n and the one or more objects along with locating the location of the user in the physical environment, is detected based on the evaluation of multi DOF poses of the AR device 102. The multi DOF may include 6 DOF poses of the AR device to detect the physical objects and represent them as 3D object-centric map representation where each physical object is represented as virtual or mixed reality objects and devices. Further, the AR device 102 may use any of the one or more devices 110a, . . . , 110n and the computing system 114 to issue instructions and commands associated with an intent to access and interact with any physical objects including the one or more devices 110a, . . . , 110n, the one or more objects and the computing system 114. For example, the instructions and commands from the user may be detected when the instructions and commands are issued via a tablet and/or a ring clicker. The user can wear the ring on a finger and clicking it enables a wireless interface with the corresponding devices 110a, . . . , 110n, and/or the one or more objects in the physical environment. Such clicking may also be achieved using EMG single click. In an embodiment, the instructions and commands from the user may be detected when the user is associated with AR device 102 via specific state-of-the-art controllers associated with the AR device 102. In particular embodiments, such issuance of instructions and commands is sensed by evaluating multi-DOF instances of the instructions and commands from the user. For example, user input in some or all possible translations (e.g., left/right, forward/backward, or up/down) or rotations (e.g., yaw, pitch, or roll). A multi DOF which supports the movements may be referred to as a 3DOF while a multi DOF which supports the translations and rotations may be referred to as 6DOF. In some cases, the user may use a finger (e.g., a thumb) to press or swipe on a touch-sensitive input device to provide input to the AR device 102, and/or to any of the devices 110a, . . . , 110n, and/or to the computing system 114.

In particular embodiments, the AR device 102 may be configured with various applications that are specific to enabling the user to access and interact with various one or more devices 110a, . . . 110n, the one or more objects, and the computing system 114 of the system 100.

In particular embodiments, the one or more devices 110a, . . . , 110n and the computing system 114 comprise any kind of electronic device for example and not by way of limitation a desktop computer, laptop computer, tablet computer, mobile phone, notebook netbook, workstation, e-book reader, GPS device, camera, personal digital assistant (PDA), handheld electronic device, cellular telephone, smartphone, augmented/virtual reality device, personal computers (PCs), entertainment devices, set-top boxes, Televisions (TVs), mobile gaming machines, smart watches, digital wristbands, gaming consoles, portable computers such as ultrabooks, all-in-one machines, TVs, internet TVs, display devices, home appliances, thermostat, refrigerator, washing machine, dishwasher, air conditioners, docking stations, game machines, digital cameras, watches, interactive surfaces, 3D displays, entertainment devices, speakers, smart homes, IoT devices, IoT modules, smart windows, smart glasses, smart bulbs, kitchen appliances, media players or media systems, orientation-based devices; and mobile gaming machines, pico or embedded projectors, medical devices, medical display devices, vehicles, in-vehicle/air infotainment systems, unmanned aerial vehicles, unmanned vehicles, automated guided vehicles, flying vehicles, navigation systems, wearable devices, augmented reality enabled devices, wearable goggles, virtual reality devices, orientation-based devices, robots (robots), social robots, (humanoid) robots (android), interactive digital signage, digital kiosks, vending machines, other suitable electronic device, and combination thereof. For clarity, FIG. 1A shows four devices like smart device 110a, mobile device 110b, smart appliances 110c, and laptop 110d, but in practical embodiments, the system 100 can include any number of devices in the physical environment. The designation "n" in reference characters such as "110n" means that in embodiments the actual number of elements corresponding to a reference character is unlimited. This disclosure contemplates any suitable client systems 730.

In particular embodiments, the one or more devices 110a, . . . , 110n and the computing system 114 may be an AR device configured to operate the features of the AR device 102. For example, the one or more devices 110a, . . . , 110n and the computing system 114 may be integrated with real-time object tracking, real-time eye tracking, real-time RGB, real-time simultaneous localizing and mapping (SLAMs) units, real-time inertial measurement units (IMUs), real-time eye gazing Further, in particular embodiments, each of the one or more devices 110a, . . . , 110n may comprise one or more processors that are configured to implement all programming instructions that are programmed or configured to host or execute functions of the computing system 114, which is described in later sections herein. Furthermore, the one or more devices 110a, . . . , 110n may be configured with various applications that are specific to enabling the user to access and interact with various one or more devices 110a, . . . 110n, the one or more objects and the computing system 114 of the system 100.

In particular embodiments, the computing system 114 may be among the one or more devices 110a, . . . 110n and/or maybe a standalone host computer system, an on-board computer system integrated with the AR device 102, graphical user interface, or any other hardware platform capable of providing artificial reality 3D object-centric map representation to and receiving commands associated with the intent of interactions from the user(s) via eye tracking and eye gazing of the user in real-time and dynamically. The computing system 114 can be implemented using server computing technology such as a server farm, a cloud computing platform, a parallel computer, one or more virtual compute instances and/or virtual storage instances, and/or instances of a server-based application. In particular embodiments, computing system 114 may include one or more servers. Each server may be a unitary server or a distributed server spanning multiple computers or multiple data centers. Servers may be of various types, such as, for example, and without limitation, web servers, news servers, mail servers, message servers, advertising servers, file servers, application servers, exchange servers, database servers, proxy servers, and other servers suitable for performing functions or processes described herein, or any combination thereof. In particular embodiments, each server may include hardware, software, or embedded logic components or a combination of two or more such components for carrying out the appropriate functionalities implemented or supported by the server.

In particular embodiments, the computing system 114 comprises a processor 116 and a memory 118. The processor 116 is programmed to implement computer-executable instructions that are stored in memory 118 or memory units. The computing system 114 may also comprise one or more data stores, for example, object and device library 124 related to storing information and data of physical objects and devices of all the physical environments associated with the user(s). Data stores may be used to store various types of information. In particular embodiments, the information stored in data stores may be organized according to specific data structures. In particular embodiments, each data store may be a relational, columnar, correlation, or other suitable databases. Although this disclosure describes or illustrates particular types of databases, this disclosure contemplates any suitable types of databases.

In particular embodiments, the computing system 114 comprises stored program instructions organized as the image-capturing engine 120, map generation engine 122, eye tracking and eye gazing engine 128, intent identification engine 130, and one or more machine learning models 132, which in turn can comprise computer-executable instructions.

The image-capturing engine 120 is programmed or configured to receive images of a physical environment surrounding a user wearing the AR device 102 or of the physical environment the user is experiencing. The image-capturing engine 120 receives live streams, moving images or video footage, pictures, etc., of the physical environment where the user is around and present. The live streams, moving images or video footage, pictures, etc., are received as one or more sensor data from digital still cameras, a digital moving image, or video cameras associated with the AR device 102 and/or associated with the computing system 114 itself.

The map generation engine 122 is programmed or configured to determine and generate a three-dimensional (3D) map corresponding to the physical environment by using the live streams and/or images and/or sensor data received and/or determined from the AR device 102. In particular, the map generation engine 122 generates the three-dimensional (3D) object-centric map of the physical environment. This three-dimensional (3D) object-centric map is generated using machine learning techniques, computer vision technology, augmented reality applications, virtual reality and mixed reality-related techniques, and existing technologies used for generating 3D map representation in AR environments. The map generation engine 120 further utilizes SLAM, object tracking, RGB, IMU, and other related 3D object detection pipelines to scan the entire zone or region or area, or space of the physical environment and then represent each physical object from the physical environment as virtual objects categorized into object representations. For example, the physical objects may include any furniture like a sofa, table, chairs, appliances such as a washer, refrigerator, TV, smart plugs, smart devices, smart lamps, and other room-defining objects like a kitchen sink, bathtub, doors, windows, flowerpots, pens, books, bottles, etc. In an embodiment, the map generation engine 120 may comprise a local detector, a global detector, and a fusion algorithm for object detection and representation in a form of a scene in a 3D map. For example, as the user moves throughout different spaces or zones or regions, artificial reality device 102 must provide synchronized, continuous, and updated feature maps with low latency in order to provide a high-quality, immersive, and enjoyable experience for users.

Each physical object in the physical environment is associated with some features and in particular embodiments, the map generation engine 122 may evaluate those features, including but not limited to physical, context, and semantic features, surface attributes, and data points associated with each physical object and other related features of the physical objects present or exist in the physical environment. For example, during object detection, the map generation engine 122 may perform various estimations such as depth estimation, size estimation, dimension segmentation, instance segmentation, three scale-regression offsets for height, width, and length along with thickness estimation, and other related estimations, to evaluate the features associated with each physical object. In particular embodiments, based on the feature evaluation, the map generation engine 122 may detect spatial locations of each physical object including smart devices 110a, . . . , 110n and objects like sofas, furniture, sink, lamps, fan, etc., depending upon the pose of the AR device 102 of the user in a particular region or area or space of the physical environment. Further, the map generation engine 122 generates the 3D map representation of the physical environment detecting all the physical objects that are in a line of sight of the user depending upon the pose of the AR device 102. The object representations in the 3D map are based on the 6DOF of the poses of the AR device 102 and also based on the distance and spatial locations of each physical object from the line of sight of the user. For example, if the location of the user in a living room is detected to be sitting on a couch facing the TV, the spatial location of each physical object such as lamps, smart plugs, light fixtures, chairs, pens, and books on the center or side table is detected when each physical object is in line of sight of the user and is detected to be at a distance evaluated from the location of the user. Based on the features evaluation, object representations, including but not limited to, bounding box, black box, depth box, pixel perfect, etc., are generated in the 3D object-centric map. In particular embodiments, each object representation in the 3D object-centric map representation may further be associated with and represented by vector elements values for example, in a vector format (x, y, z) [(r, g, b)].

In particular embodiments, the map generation engine 122 may display the 3D map representation of a scene or image or videos of the physical environment in a form of a bird's-eye view and/or user point of view representing all the physical devices 110a, ..., 110n and objects like a couch, carpets, etc., in a virtual manner. In particular embodiments, one or more 3D maps generated are indexed, and updated that correspond to the area or region of interest the user is experiencing (e.g., an "interior 3D map" for a user's home, a "3D kitchen map" for a kitchen zone, or "office 3D map" for a particular office area). These maps can be stored locally (e.g., on the user's device 110a, ..., 110n, or in the computing system 114) or through cloud storage.

In one embodiment, all the physical objects including all the one or more devices 110a, ..., 110n such as smart devices or IoT devices, and all the other one or more objects such as couches, people, pillows, toys, boxes, chairs, pots, etc., are associated with one or more tags, info-label data, object types, classifiers, and identifications. Further, all the one or more devices 110a, ..., 110n, and all the other one or more objects are categorized into one or more categories and stored in data stores or in object and device library 124 of the computing system 114. In particular, all the one or more devices 110a, ..., 110n and all the other one or more objects are stored in an object and device data repository 126 that may be a storage unit that may be in a form of any of mapping table, map entries, a list format, a tagged format, lookup table, data structures, relational database, object database, flat file system, SQL database, or no-SQL database, an object store, a graph database, or other data storage.

In particular embodiments, each of one or more devices 110a, ..., 110n, and all the other one or more objects are assigned with confidence distribution score. The assignment of confidence distribution score is on a basis of one or more factors including, but not limited to, instances associated with each physical object e.g., the lightbulb in the hallway vs. any lightbulb, factors defining the number of times the same physical objects are detected in the past and in a present time e.g., in real-time, factors of observance and machine intelligence to identify physical objects automatically, factors of registration of such physical objects into the system, or factors of continuity of such physical objects specifying repeated existence of the physical objects in the physical environment and/or other related factors related to object identification in AR related environment. The confidence distribution score is used to detect and identify which of the one or more devices 110a, ..., 110n, and/or the objects the user is likely to access and/or interact with. In particular embodiments, the confidence distribution score associated with each physical object and object representations in 3D maps may be used in combination with various machine learning models. For example, the confidence distribution score may be one of the attributes or parameters for training and updating machine learning models. In this way, the computing system 114 may accurately identify the one or more devices 110a, ..., 110n, and the one or more objects the user may be interested to access and interact with within the present time (e.g., currently, or in the real-time instance).

Additionally, the computing system 114 may predict which of the one or more devices 110a, ..., 110n, and the one or more objects, the user will be interested to access and interact with in future instances. In particular embodiments, the computing system 114 may leverage artificial intelligence (AI), AI-based computer vision techniques, deep learning neural networks, and/or machine intelligence to demonstrate intelligent behavior for automation and/or prediction of user intent for interaction with and/or operating the one or more devices 110a, ..., 110n, and the one or more objects in the physical environment.

In a particular embodiment, the computing system 114 may include the eye tracking and eye gazing engine 128 for performing eye tracking and eye gazing techniques. For example, the eye tracking and eye gazing engine 128 carries out eye tracking and eye gazing techniques based on eye tracking data and eye gazing data tracked and received from the eye tracking units and the eye gazing units configured in the AR device (e.g., eye tracking glasses) 102. The computing system 114 may be configured to use any of state of art eye tracking gazing techniques for determining a gaze of each eye of the user in real-time. In one example, the eye tracking and eye gazing engine 128 may determine a gaze of only one eye of the user at a time to place eye rays in a particular frame of reference, for example, to determine where and which object the user's eye is looking at. In particular embodiments, for determining the gaze of the eye of the user, the computing system 114 and/or the eye tracking and eye gazing engine 128 may first localize the user in the 3D object-centric map representation by using existing SLAM, IMUs, RGB-D, and other localizing techniques. After localizing the user in the 3D map, the gazing of each eye of the user is determined and each eye gaze is convergent for locating a spatial location of each of the one or more devices 110a, ..., 110n, and the one or more objects. The one or more devices 110a, ..., 110n and the one or more objects are identifiable when data points and features including context and semantic features of the objects and devices match with predetermined data points and features including context and semantic features of the objects and devices in the object and device library 124 associated with data repository of objects and device 126. Particularly, the spatial location of each of the one or more devices 110a, ..., 110n and the one or more objects located is in the line of sight of the user's gaze or user's focus. In some embodiments, the spatial location of each of the one or more devices 110a, ..., 110n and the one or more objects is located that is at a predetermined distance from the line-of-sight of the user's gaze or user's focus. Based on a user gaze direction, a region of interest is determined in the 3D map, for example, the region of interest may be a region or area or space, or zone the user is likely looking at. In an example, the region of interest is determined within or around a radius around an intersection or a point of eye gaze convergence. The eye gaze convergence is determined with eye gaze vector elements or values when the eye gaze convergence is determined to intersect at a particular device or object in the 3D map. In particular embodiments, the eye tracking and eye gazing engine 128 determines one or more representations of physical devices in the region of interest of the 3D map. For example, any of the one or more devices 110a, ..., 110n, and/or objects that are represented as virtual representation in the 3D map are determined to be a particular region of interest based on the user's eye gaze direction, for example, the user is likely looking at within the user's line of sight (e.g., the user can't be looking at something behind a wall or doors). For example, in the particular region of interest according to the user's eye gaze direction, there may be smart IoT devices or any objects other than IoT devices, such as chairs, pens or pots, tables, etc.

In particular embodiments, the intent identification engine 130 is programmed or configured to determine the intent of the user to access and interact with a particular physical device represented as object representations (e.g., virtual device or objects) in the 3D map. The intent of the user is determined by determining the instructions and one or more contextual signals. The instructions may be explicit (e.g., "turn on a light") or implicit (e.g., "where did I buy this"). For example, the implicit instruction may be based on determining the eye tracking and eye gazing process as well without referencing the physical device. The intent identification engine 130 may further determine the one or more contextual signals that may include, but are not limited to, kinds of user intents for interacting with the physical objects or devices, kinds of commands detected based on previously issued commands of the user in the past, and based on other factors such as time of the day the user has interacted before or the user is likely to interact in present time, user behavior learned from previous actions or intents, or predicting user behavior in the present time, current state and historical state of both the user and the physical objects and/or devices, historical context semantics of the user intent for interaction, weather forecast information in the present time, past time or for the future time, default settings set for each physical object or device, priority scores associated with each physical object and/or device, different zones or regions of interest the user has shown specific priority or interest to interact, number of times of each of the factors stated above, and other related factors that are specific for interacting with various physical objects and/or devices including the factors used for training and updating the machine learning models. Additionally, the intent identification engine 130 is programmed or configured to determine the intent of the user by leveraging artificial intelligence for automatically determining such intent of the user in real-time and dynamically and/or for automatically predicting such intent of the user in real-time and dynamically.

In particular embodiments, the intent identification engine 130 is programmed or configured to determine and identify commands issued to a particular device of the one or more devices 110a, . . . , 110m and/or objects when the intent to access and/or interact with the particular device is determined. For example, the commands with the intent to access and/or interact with the particular device may be determined in real-time and/or predicted using machine learning models, artificial intelligence, and other related techniques. The commands may include but are not limited to, any head gesture, hand gesture, voice gesture, finger taps, drag and drop movement, finger pinching, rotating movement, bloom gesture, resizing, selecting, moving, a natural language query, and any other kinds of AR-related commands to interact. In particular embodiments, the commands may be determined from the one or more controllers, pointers (e.g., mouse pointer or laser pointer), trackpad, one or more buttons, GUI-based elements, and other related components that are typically wearable or not wearable used for interacting with any of the one or more devices 110a, . . . , 110n. For example, the user can use a ring clicker or EMG wearable device, or a tablet providing a low friction single-click interface when the eye tracking and eye gazing process is implemented.

In particular embodiments, the intent identification engine 120 is programmed or configured to determine whether the user is accessing any of the one or more devices 110a, . . . , 110n to interact with the particular device or a target device. For example, the user 404 may use other IoT devices like "Alexa" or "refrigerator" through which the user may interact with TV. For example, the user may say "turn on" to the refrigerator, and the refrigerator must instruct the TV to turn on itself to comply with the user's instructions for accessing and/or interaction. In this way, any of the IoT devices may be used as a medium through which the user may access and/or interact with the target device in the physical environment.

In particular embodiments, the intent identification engine 130 is programmed or configured to determine and identify predictive interfaces and the intent of the user through carrying out various predictive processes that may use machine learning models, artificial intelligence, and other related techniques. For example, the intent identification engine 130 acquires live streams and images from the AR device 102 and determines a historic state of the user at a present time and a current state of the user along with determining a location of the user who is proximal and/or around the one or more devices 110a, . . . , 110n at the present time. For example, the historic state of the user is where the user is coming from or doing prior to this moment, and the current state of the user is the user's location in the present moment, or predicting the current state of the user is going to be in a certain moment, etc. The region of interest that is at best of interest to the user at the present time is identified by determining the eye gaze direction of the user. Additionally, a device historic state, and a device current state of all the one or more devices 110a, . . . , 110n are also determined that are present around or proximal to the user experience at the present time. For example, the historic state and current state of the device may include modes of the device such as on/off mode, modes associated with dimming or brightening the light, or the speed of a smart fan, wash mode of the washer, cooling mode of the fridge, heat mode of the oven, and other dynamic modes of any device, etc. The confidence distribution score, associated with each device 110a, . . . , 110n and objects that are present at the user eye gaze direction, is used to predict which of the devices 110a, . . . , 110n or objects the user intends to interact with in the certain computed time. For example, assuming there are four physical objects in the direction of the user's eye gaze, such as a TV, a table, a digital photo frame, and a smart lamp. An output of the machine learning model and/or intent identification engine 130 is associated with a probability and/or confidence distribution score of the user being interested in interacting with certain objects and devices, for example, 60% certain that the user likes to interact with the smart lamp because each time the user enters or present in the zone of the smart lamp during a particular time of the day, the user likes to either "turn on" or change the modes of the smart lamp to or from on/off mode. Similarly, probability and/or confidence distribution score with 30% certain that the user wants to interact with the lightbulb, and 20% with the TV, etc. In some examples, based on the higher confidence score estimated for the corresponding device and intent, the interaction is enabled. In particular embodiments, the predictive interfaces are determined based on factors such as kinds of user interactions with the physical objects or devices, kinds of commands detected based on previously issued commands of the user in the past, time of the day during which the user has interacted before or the user is likely to interact in present time, user behavior learned from previous actions or intents, or predicting user behavior in the present time, current state and historical state of both the user and the physical objects and/or devices, historical context semantics of the user intent for interaction, weather forecast information in the present time, past time or for the future time, default settings set for each physical object or device, priority scores associated with each physical object and/or device, different zones or regions of interest the user has shown specific priority or interest to interact, and a number of times of each of all the factors stated above. For example, assuming there are five physical objects in the direction of the user's eye gaze, such as a thermostat, a TV, a table, a digital photo frame, and a smart lamp. Based on the earlier user behavior and patterns of interactions, it is determined that whenever the user sits on a couch, the user would like to watch the TV while turning on the thermostat to set the temperature. Setting the thermostat can depend on the weather forecast information as well, for example, if the weather is determined to be raining then the thermostat is set off. Another example, assuming there are newly identified people in the user environment, and from past settings and user patterns, the user changes the photos in the digital frame. Therefore, intent identification engine 130 determines such likelihood of the user intent and issues the command to change the digital photo frame settings based on detecting the user's head gestures or other kinds of gestures. Another example is, the machine learning models and/or intent identification engine 130 learns the user's behavior and predicts which of the one or more devices 110a, . . . , 110n, and/or the objects the user is likely to access and/or interact with, in similar contexts that are similar or likelihood with earlier contexts. For example, the machine learning model and/or intent identification engine 130 learns that when the user uses a smartwatch in the kitchen, it is usually to set a timer. Next time, when the user is detected to be entering the kitchen during a particular time of the day or for some duration or with some food, the machine learning model and/or intent identification engine 130 might predict to instruct the smartwatch to display the associated stopwatch app automatically for setting the timer or watch over the set timer while heating the food in the oven. In some examples, the user can issue a natural language query. For example, a side table is present around the location of the user and the user's eye gazes at that side table and utters "where did I buy this". The information and details of that side table are automatically provided to the user for viewing on a graphical user interface of any of the AR device 102 and/or one or more devices 110a, . . . , 110n that are communicatively connected or associated with the computing system 114.

In particular embodiments, the disclosure determines the intent of the user for interaction with one or more physical objects not only on the basis of eye tracking and eye gazing techniques but also on the user's location based. The intent detection engine 130 determines 1) a location of the user (localizing the user) in the present time, 2) objects and/or devices detected in a region of the physical environment around or proximal to the location of the user in the present time, 3) current state of both the user and objects and/or devices around or proximal to the location of the user. When user of artificial reality device 102 traverse throughout the physical environment, for example by moving throughout rooms or areas or floors or zones of a particular environment or house or building, etc., artificial reality device 102 must provide synchronized, continuous, and updated feature maps with low latency in order to provide a high quality, immersive, quick, seamless and enjoyable experience for users in accessing the three-dimensional map for the area as the user enter them while reducing the potential for latency and performance issues required for the interaction. In particular, live streams of images of the physical environment the user is entering or present in are received from the AR device 102 and determined by the image-capturing engine 120. A three-dimensional (3D) map is generated by the map generation engine 122 for a current region of interest where the user is located or where the user is in proximity to the current region of interest. Based on the three-dimensional map and location of the user, one or more representations of the physical objects including electronic devices 110a, . . . , 110n and other objects different from those electronic devices 110a, . . . , 110n (e.g., people toys, pillows, chairs, carpet, etc.) are localized and identified by looking up in the object and device library 124 associated with data repository of objects and device 126. The objects and devices are identifiable when data points and features including context and semantic features of the objects and devices match with predetermined data points and features including context and semantic features of the objects and devices in the object and device library 124 associated with the data repository of objects and device 126. In particular, the physical objects in a field of view or a bird's eye view with respect to the location user are identified and represented as the one or more representations in the three-dimensional map along with spatial locations from the location of the user. The intent identification engine 130 determines the intent of the user for enabling access and interaction with one or more physical objects in real-time dynamically based on the detected location of the user along with detection of the one or more devices 110a, . . . , 110n and the one or more objects in the current region of interest. The intent of the user is accomplished by using any of the trained machine learning models and/or explicit instructions including commands for interaction from the user and/or pre-set commands for such interaction. For example, when the user is determined to be in the kitchen and says, "turn on," such a command is detected to refer to the lights in the kitchen. Another example is, when the user is in the kitchen and uses a smartwatch, it is usually to set a timer. Next time, when the user is detected to be entering the kitchen during a particular time of the day or for some duration or with some food, the machine learning model and/or intent identification engine 130 might predict to instruct the smartwatch to display the associated stopwatch app automatically for setting the timer or watch over the set timer while heating the food in the oven.

In particular embodiments, the computing system 114 includes one or more machine learning models 132 that are pretrained and trained over time regularly based on the output of each interaction and access from the user with various commands to the physical objects. For example, the machine learning models 132 are pre-trained before installation and are trained over time, periodically in different intervals and/or according to each user's experiences associated with the intent of accessing and interacting with any of the one or more devices 110a, . . . , 110n and the one or more objects in the physical environment. Further, each of the machine learning models 132 is trained dynamically in real-time and automatically with or without the user's explicit commands to update certain intent. Further, machine learning models 132 are trained during the configuration of the AR device 102, and computing system 114 for determining the intent during each user experience in the physical environment.

Figure 5A:
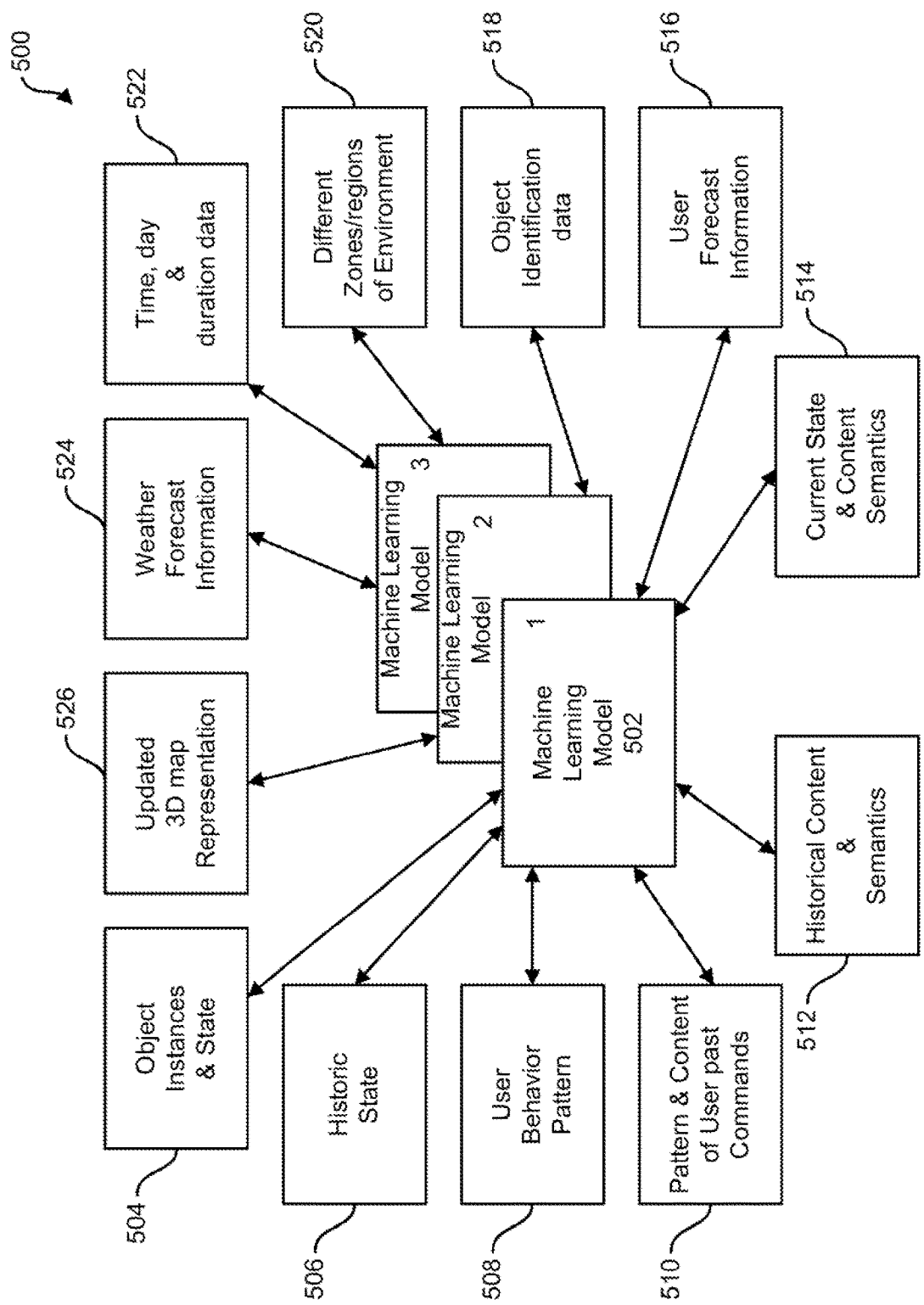
FIG. 5A and FIG. 5B illustrate machine learning models with the context of their use and functionality according to an embodiment.
Figure 5B:
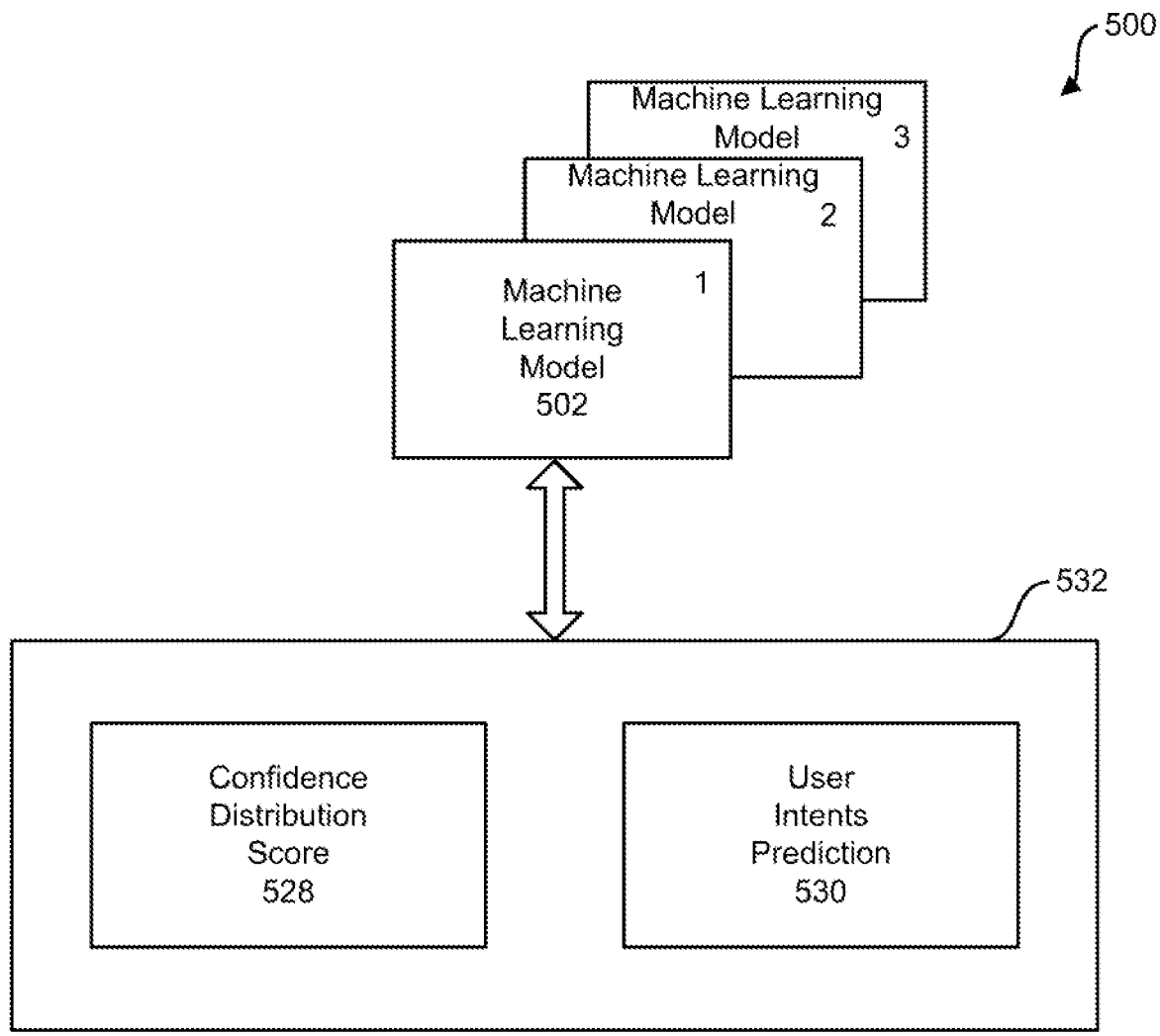

In particular embodiments, the machine learning models 132 observe, learns, and train themselves based on the commands as well that may include but are not limited to, any head gesture, hand gesture, voice gesture, finger taps, drag and drop movement, finger pinching, rotating movement, bloom gesture, resizing, selecting, moving, a natural language query, and any other kinds of AR-related commands to interact, commands via controllers, pointers (e.g., mouse pointer or laser pointer), elements, and other related components that are typically wearable or not wearable used for interacting with any of the one or more devices 110a, . . . , 110n. For example, the user can use a ring clicker or EMG wearable device, or a tablet that provides a low-friction single-click interface. In this way, the user experience is quick with low latency and reduced response time when the machine learning models 132 are used to quickly apply context and commands to the intent of the user that is similar to the intent in the past or in the recent scenario. The factors for the training of the one or more machine learning models 132 are illustrated in FIG. 5A and FIG. 5B in a later section herein.

FIG. 1B illustrates an artificial reality (AR) device 102 and a user 136 wearing the AR device 102 as a wearable device to experience the physical environment as virtual reality or mixed reality. In an embodiment, the AR device 102 may be a non-wearable device as well, for example, configured in a mobile phone or tablet. As an example, the AR device 102 may be a head-mounted display (HMD) (e.g., glasses) comprising a frame, one or more displays 108, and various other components (not shown) that a typical AR device 102 would comprise and that the person of ordinary skill in the art would understand and perceive. The displays 108 may be transparent or translucent allowing the user 136 wearing the HMD 102 to look through displays 108 to see the real world and display the visual artificial reality content to user 136 at the same time. The HMD 102 may include an audio device that may provide audio artificial reality content to users 136. The HMD 102 may include one or more cameras that can capture images and videos of environments. The HMD 102 may include an eye-tracking unit or system to track the eye gazing and vergence movement of the user wearing the HMD 102. The HMD 102 may be integrated with SLAM, IMUs, RGB-D unit, and object identification unit capable of providing artificial reality content to and receiving commands and inputs from user 136.

Figure 1C:
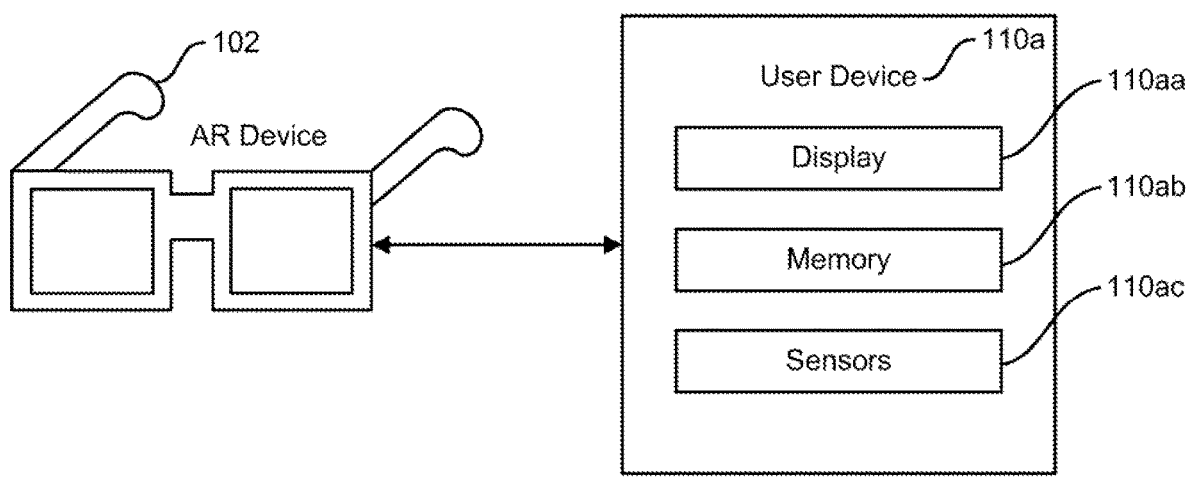
FIG. 1C illustrates an example artificial reality (AR) device and a user device.

FIG. 1C illustrates an example of an artificial reality (AR) device 102 and a user device 110 for example, a mobile phone. The AR device 102 may comprise a headset and the user may wear the headset 102 that may display visual artificial reality content to the user. The headset 102 may include an eye-tracking unit and system to determine eye gazing direction of the user. In particular embodiments, the headset 102 (AR device) estimates a pose in 6DOF determining the spatial location of the user and spatial location of each of the physical objects, such that the user 102 may perform certain functions via the controller 106. In particular embodiments, the user device 110 may be integrated with the computing system 114 and may be connected to the AR headset 102 through cables or wireless connections. The user device 110 may comprise all the components and the units of the AR device 102 (e.g., the headset) and the computing system 114 for determining the intent of the user for interaction with the physical objects based on the eye gazing evaluation, location of the user, and predictive interface. For example, the user device 110 may comprise display 110aa, memory 110ab, sensors 110ac, and other elements that the AR device 102 (e.g., the headset) and the computing system 114 may contain for determining the intent of the user for interaction. The one or more controllers 106 may include a combination of hardware, software, and/or firmware not explicitly shown herein so as not to obscure other aspects of the disclosure.

Figure 2:
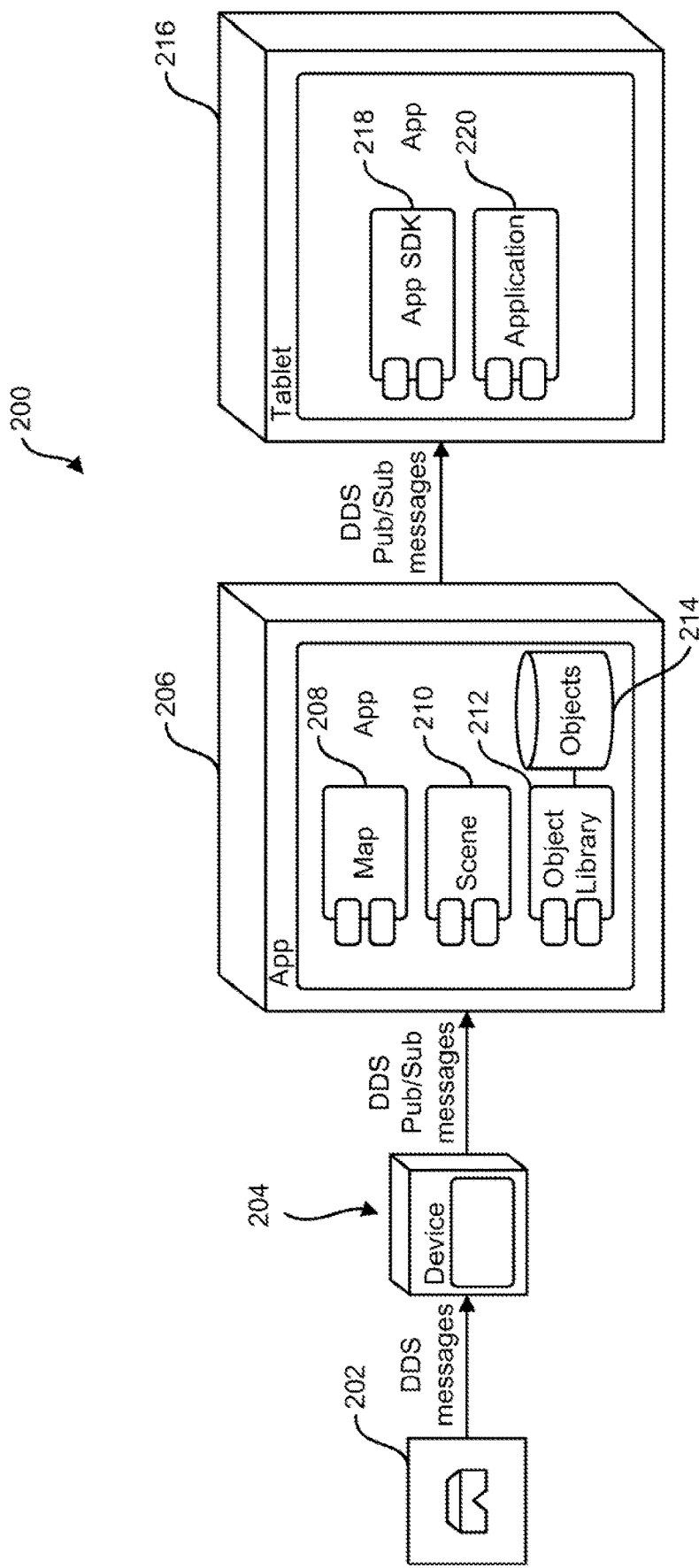
FIG. 2 illustrates an example Application Programming Interface (API) platform, according to an embodiment.

FIG. 2 illustrates an example Application Programming Interface (API) platform 200, according to an embodiment. In particular embodiments, FIG. 2 shows the API platform 200 comprising an AR device 202, a user device 204, a hub or computing system 206, and one of IoT devices such as a tablet 216. The API platform 200 enables an external application to interface with the 3D map capabilities implemented in the 3D map. The purpose of the API platform 200 is associated with enabling an application, for example, the application running on a mobile device 204 or in hub 206 or in tablet 216, to provide a stable interface through which to query the state of the persistent 3D map and interact with the virtual objects that correspond to the physical objects of the physical environment. In an embodiment, the API platform 200 enables a heterogenous set of devices including the mobile device 204 or the hub 206, the tablet 216, or any IoT devices to be connected through a standard messaging middleware e.g., DDS messages. Each of the devices in the API platform 200 is capable sending and receiving DDS messages. For example, the AR device 202 is a pair of smart glasses with AR features, and the AR device 202 is configured to capture dynamic live streams, and images of a scene of the physical environment and performs eye tracking and eye gazing processes. The AR device 202 is connected to the user device 204, for example, a mobile phone or laptop. The AR device 202 exchanges or streams captured images or live streams using the DDS messages to the mobile phone 204 and distributed across multiple physical devices in the physical environment. The mobile phone 204, based on the captured live streams or images of the physical environment, determines the region of the physical environment according to the pose(s) of the AR device 202 associated with the user. In particular, the mobile phone 204 extracts various first features of the physical objects, such as features, including but not limited to physical, context, and semantic features, surface attributes, and data points associated with each physical object and other related features of the physical objects present or exist in the physical environment, for generation of 3D maps. The mobile phone or laptop 204 exchanges the data relating to the identified region, pose, location of the user, and various features of the physical objects to the hub 206 or the computing system 206 by using DDS Pub/Sub communication messages. The hub 206 comprises map application 208 to host the 3D maps in a form of a scene graph encoding or locating spatial relationships between different physical objects, e.g., a book and pen are on a table, the table is against a wall, TV is mounted on the wall, smart lamp above a side table, etc. The hub 206 also comprises scene applications 210 to generate 3D object-centric map representation of the scene for the entire region of the physical environment where the user is experiencing or located or around or proximal to such environment. The scene application 210 localizes not only the user in the environment but localizes all spatial locations of each of the physical objects including the one or more devices like smart plugs, smart appliances, washers, fans, TV, humidifier, and objects, like pens, book on a table and table against the wall along with detecting people as well. Each physical object is identified based on matching the features of each detected object with the predetermined object features in the object library 212 and objects data store 214. However, the hub 206 implements or functions as artificial intelligence and machine learning models to identify any object automatically and dynamically and in real-time. The hub 206 thus generates second features of object representations in the 3D maps, for example, the second features of the object representations may comprise virtual representations including bounding box, data points, RGB-D representation, and pixel-perfect representations. The hub 206 is configured to determine the location of the user, eye gazing convergence of the user's eyes at particular devices for identifying devices of interest, predictive interface, devices of interest based on user's location in particular zones of the physical environment, etc. The hub 206 is connected to various IoT devices of interest such as the tablet 216 which receives all the data and information from the hub 206 via DDS Pub/Sub communication messages. The tablet 216 or IoT device comprises application SDK 218 that is configured to take and execute commands from the AR device 202 and/or the hub 206. The application SDK 218 processes the user commands via executing instructions of variously configured applications 226 and calls specific application functions 220 stored in a memory unit of the hub 206.

In particular embodiments, the API platform 200 exposes various capabilities of 3D map representation, which is associated with the first features of the physical objects and the second features of object representations, to external applications which may be hosted by various IoT devices 204, 206, 216 and/or any of physical devices represented in the 3D object-centric map representation. For example, the API platform 200 exposes a snapshot of current object states, for all objects and connected devices, published at regular frequencies. In an embodiment, the object library 214 is provided to a TM application, to store heavy data, such as 3D models, textures, materials, or any immutable metadata, as part of the object model. Thus, such heavy data may not be transmitted through messaging. The API platform 200 exposes the current eye vector from real-time eye tracking. The API platform 200 exposes the current object that the user is looking at or intending to interact with where such current object is detected through proximity and eye gaze. The API platform 200 issues a command to an object and/or a device in the physical environment to change states for certain objects and/or devices whose states are user changeable, e.g. a smart light bulb.

In particular embodiments, various capabilities of the API platform 200 for 3D map representations may be implemented as DDS messages. For example, DDS schemas for known strong data types like poses, bounding boxes, etc., are illustrated along with embedding a json object in DDS messages for arbitrary data types that are not captured by the known types. At regular intervals, the hub 206 updates the latest object and devices' states, the eye-tracking vector, and the object the user is currently looking or gazing at, via DDS messages.

TABLE 1

| Message Type | DDS Schema | Rate [Hz] |
|---|---|---|
| Scene state: Object & Devices | struct DeviceStateMsg {<br>  string deviceUid;<br>  // Pose<br>  Se3Msg T_world_device;<br>};<br>struct ObjectStateMsg {<br>  unsigned long long objectId;<br>  // Pose<br>  Se3Msg T_world_object;<br>  // 3D AABB<br>  AlignedBox3dMsg bbox3;<br>  // Retrieval, library object id<br>  string prototypeId;<br>  // Interactive state<br>  string jsonState;<br>};<br>struct SceneStateMsg {<br>  unsigned long long unixEpochTimeNs;<br>  // Devices pose<br>  sequence<DeviceStateMsg> devices;<br>  // Geometric state of objects<br>  sequence<ObjectStateMsg> objects;<br>}; | 10 (limited by AR glasses) |
| Eye Vector | struct EyeVectorMsg {<br>  string deviceUid;<br>  Se3Msg T_world_eye;<br>};<br>struct EyeVectorArrayMsg {<br>  unsigned long long unixEpochTimeNs;<br>  sequence<EyeVectorMsg> eyeVectors;<br>}; | 10 (limited by AR glasses) |
| Object Attention | struct ObjectAttentionMsg {<br>  string deviceUid;<br>  // Object selected by the attention mechanism<br>  unsigned long long attentionFocusObjectId;<br>};<br>struct ObjectAttentionArrayMsg {<br>  unsigned long long unixEpochTimeNs;<br>  sequence<ObjectAttentionMsg> attentions;<br>}; | 10 |

In an embodiment, applications send commands to the hub 206 using DDS. There is no request response and applications issue commands, and the broadcasted scene state can be observed to determine if any of the actions mutated produced any changes.

TABLE 2

| Message Type | DDS Schema |
| --- | --- |
| Command request | struct CommandMsg {<br>  string applicationId;<br>  unsigned long long requestNumber;<br>  string commandJson;<br>} |

In particular embodiments, the static object information stored in the object library 212 is determined using object metadata. The object library 212 includes a json file, resource files, and potentially a set of C++ classes to interface with each of the json file, resource files. The metadata schema is illustrated with the following example:

```
{
    "objectId": 42,
    "category": "Light",
    "name": "SYMFONISK Table lamp with WiFi speaker",
    "Img": {
        "name": "thumbs/SYMFONISK.png",
        "Dims": [200, 200]
    },
    "interactiveElements": {
        "power": {
            "type": "Button"
        },
        "color": {
            "type": "Selector",
            "states": ["red", "blue", "green"]
        },
        "level": {
            "type": "Slider",
            "range": [0, 100]
        }
    }
}
```

In an embodiment, when issuing a command, applications refer to the interactive elements of an object:

Example 1, Change the Intensity of a Light by a Certain Increment

```
{
    "targetObjectId": 1234,
    "commandTarget": "level",
    "command": {
        "action": "Slider::Increment",
        "value": 10,
    }
}
```

Example 2, Set the Intensity of a Light to a Specific Value

```
{
    "targetObjectId": 1234,
    "commandTarget": "level",
    "command": {
        "action": "Slider::Set",
        "value": 25,
    }
}
```

Example 3: Turn on the TV

```
{
    "targetObjectId": 1234,
    "commandTarget": "power",
    "command": {
        "action": "Button::ON",
    }
}
```

In an embodiment, the state of each object may be represented as json, as part of the SceneStateMsg:

```
{
    "interactiveElements": {
        "power": {
            "type": "Button"
            "value": true
        },
        "color": {
            "type": "Selector",
            "value": "red"
        },
        "level": {
            "type": "Slider",
            "value": 25
        }
    }
}
```

Figure 3:
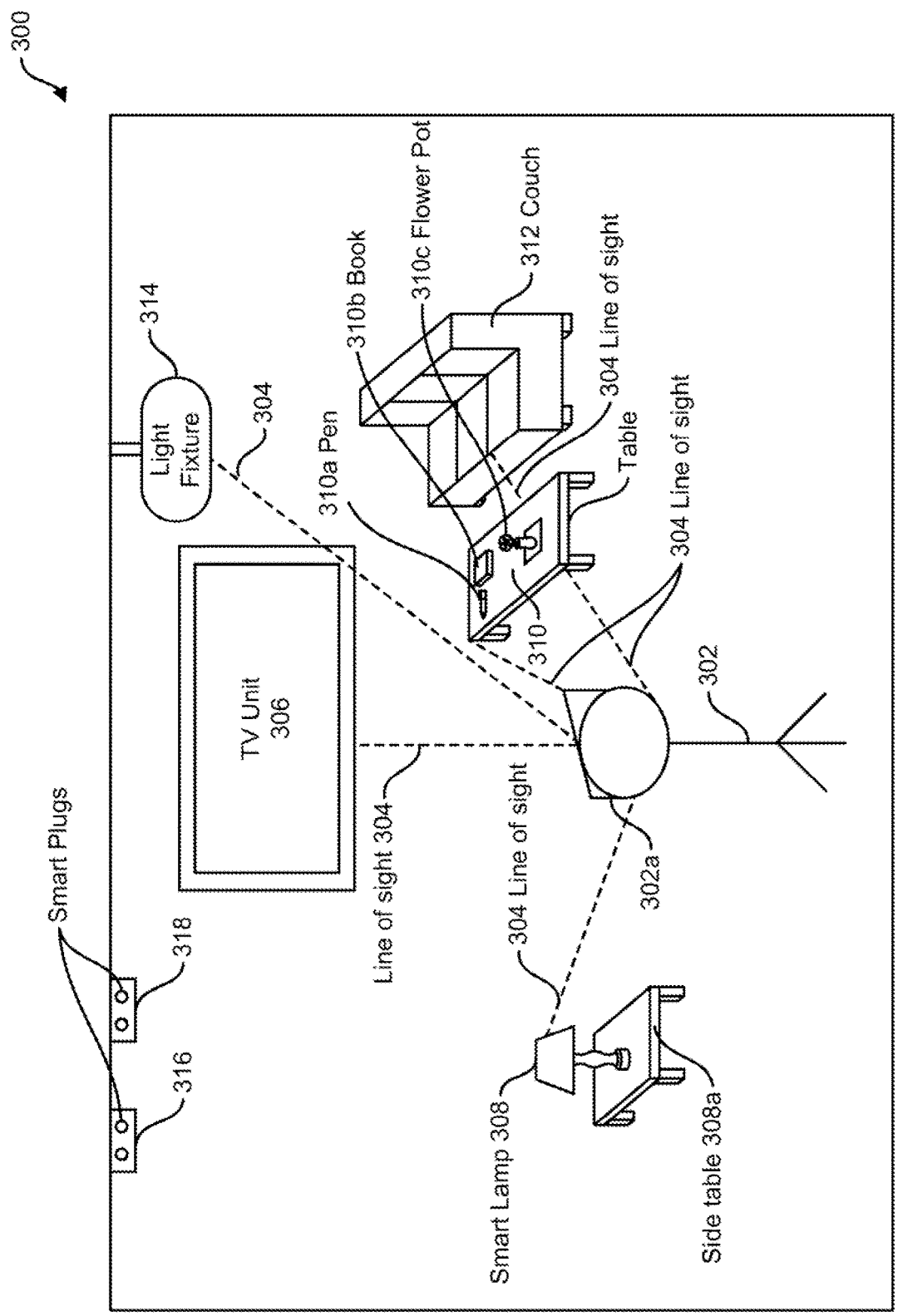
FIG. 3 illustrates an example of the physical environment of the user with all devices and objects that are in line-of-sight of the user.

FIG. 3 illustrates an example of the physical environment 300 of the user 302 with all devices and objects that are in line-of-sight 304 of the user 302. FIG. 3 shows an example scenario of living room 300 as the physical environment and the living room 300 may be only a part or zone or area or region of the physical environment. The physical environment may relate to any kind of environment such as office, hospital, school premises, and the like establishments and entities. In FIG. 3, the user 302 may be wearing the AR device 302a as smart glasses and is standing in the living room 300. In living room 300, there may be an 'n' number of devices and objects. In this example scenario, the user may be predicted or determined to be associated with an intent to access and/or interact with any of the devices and objects in this physical environment where the intent is determined according to the process of eye gazing. The devices may be TV unit 306 mounted on a wall, smart lamp 308, light fixture 314, and smart plug units 316 and 318 located next to where TV is mounted on the wall. In the same living room, there may be a 'n' number of objects such as side table 308a, a center table 310, pen 310a, book 310b, and flowerpot 310c all kept on top of the center table 310, a couch 312 with three sitters, and so on. Each of the devices and objects in any environment is associated with first features corresponding attributes, parameters, features, geographies, structural parameters, dimensions measurement, alignment measurement, positioning measurements, and size parameters along with depth measurements, size measurements, orientation measurements, instance measurements, three scale-regression offsets for height measurements, width measurements, and length measurements along with thickness measurements, and other related measurements, and parameters, that defines the devices and objects for identifying them. In this scenario, all the devices and objects in the living room are assumed to be located in the line of sight 304 (shown in dashed lines or dotted lines) of the user 302 at corresponding spatial locations in the living room 300. Additionally, all the devices and objects in the living room are assumed to be located in the line of sight 304 of the user 302 based on some distance from the line-of-sight of the user. The device and objects that are located in a predetermined distance are located, for example, device and objects that are located within 2 meters of distance from the user 302 are located. In an embodiment, each of the first features is captured accurately by the AR device 302a as live streams or images, moving images, dynamic pictures, or any kind of images for the generation of 3D object-centric maps.

Figure 4A:
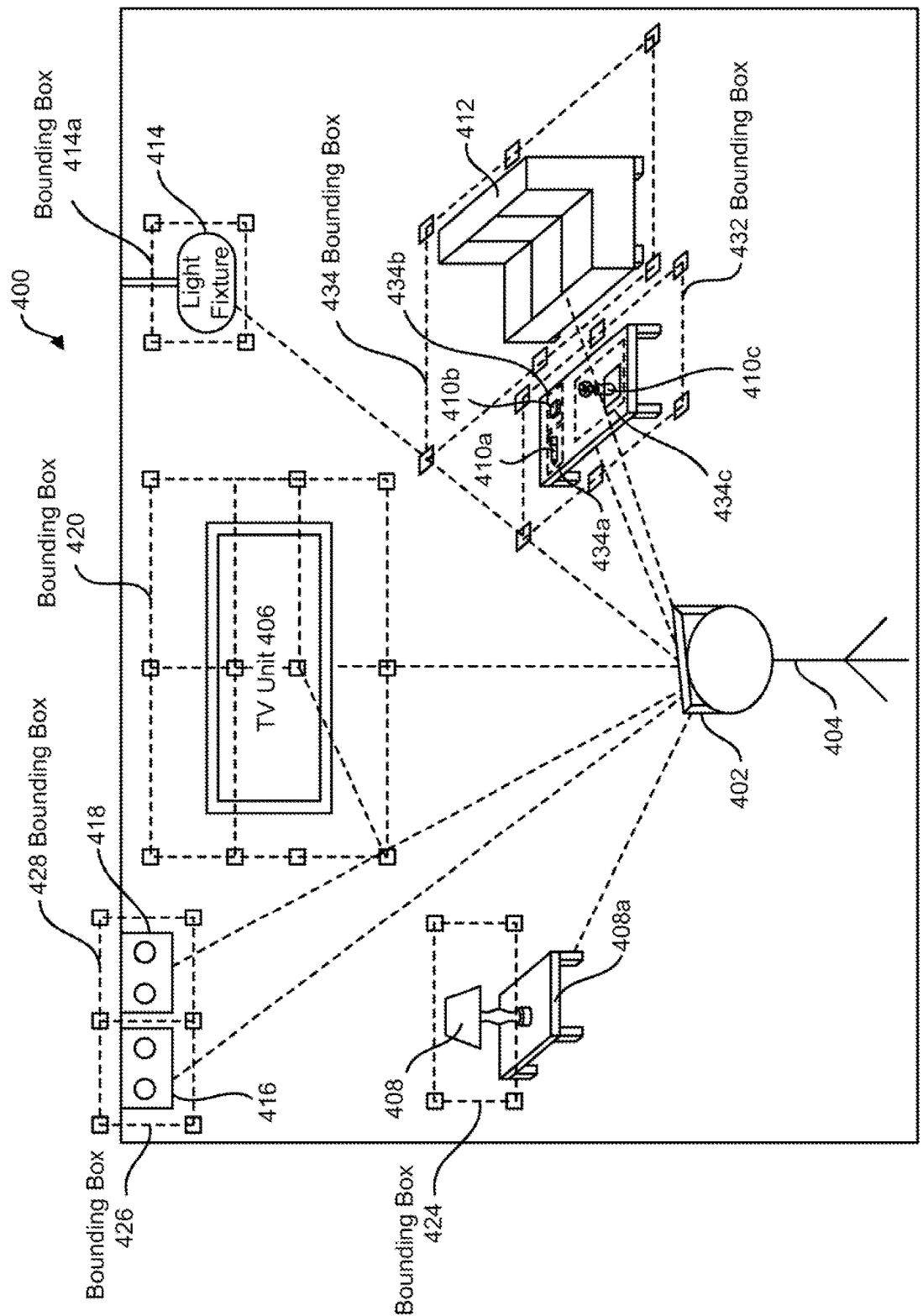
FIG. 4A illustrates an example showing a bounding box and data points of all features associated with each device and object present in a region of interest and that are in the line-of-sight of the user viewability in the physical environment.

FIG. 4A illustrates an example showing a bounding box and data points of all features associated with each device and object present in a region of interest and that are in the line-of-sight of the user viewability in the physical environment. FIG. 4A illustrates the same example scenario from FIG. 3 where each device and object associated with the first features are determined in the physical environment and associated with corresponding second features of the object representations in the 3D map e.g., 3D object-centric map representations for all the devices and objects in the physical environment. The physical environment includes many areas, zones, regions, and spaces, for example, the living room, kitchen, hallway, bathroom, etc. Each of the areas, zones, regions, and spaces may be in particular geometrical dimensions that may be based on one or more geometric properties of the area. Also, each area, zones, region, and space may further contain divisions. Further, each device and object such as TV unit 406 mounted on a wall, smart lamp 408, light fixture 414, and smart plug units 416 and 418 located next to where TV 406 and objects such as side table 408a, a center table 410, pen 410a, book 410b, and flowerpot 410c all kept on top of the center table 410, a couch 412 with three sitters, and so on, are identified by the AR device 402 for object representations in the 3D map i.e. 3D object-centric map representation. In particular, the AR device 402 is configured to capture images of the scene of the living room 400 and detect each geometric dimension of the entire living room 400, including detecting the first features of each of the devices and objects. In particular embodiments, the first features of each of the devices and the objects are represented as the second features for object representations in the 3D map that depends upon the 6DOF of poses of the AR device 402 or of the user using the AR device 402. For example, the first features of each of the devices and the objects are represented as bounding box, pixel perfect, black box, depth box, data points RGB-D representation, and any virtual representations, etc., in the 3D object-centric map. In FIG. 4A, the TV unit 406 is represented with bounding box and data points 420, the lamp 408 is represented with bounding box and data points 424, the side table 408a is represented with bounding box and data points 422, the smart plug 416 is represented with bounding box 426, the smart plug 418 is represented with bounding box 428, the light fixture 414 with bounding box 430, the center table 410 with bounding box 432, the pen 410a with bounding box 434a, the books with bounding box 434b, and the flowerpot with bounding box 434c, etc. In particular embodiments, these object representations are received by the computing system 114 for detecting each device and object by determining the second features associated with each device and object. In an embodiment, the second features of each device and each object are matched with the predetermined features in the object and device library 124 corresponding to the object data store 126 in the computing system 114 for recognizing each device and object accurately. In some embodiments, if the device and/or object are not matched with the predetermined features in the object and device library 126, then such devices and objects are determined to be new devices and objects. In such scenarios, the newly detected devices and objects are updated in the object and device library 126 for quick lookup next time when they are detected again. In some embodiments, the process of machine vision, artificial intelligence, deep learning, and machine learning helps in recognizing each device and each object accurately, automatically, and dynamically in real time. The identification of the devices and objects is used for generating map representation in the 3D map. In particular embodiments, the machine learning models are updated with each 3D map generated in each instance along with updating the instances or presence or existence of each device and object in a particular location in the physical environment. In this way, the artificial intelligence of the process for determining the intent of the user for interaction may be determined through the updated machine learning models, and real-time and dynamic interactions.

Figure 4B:
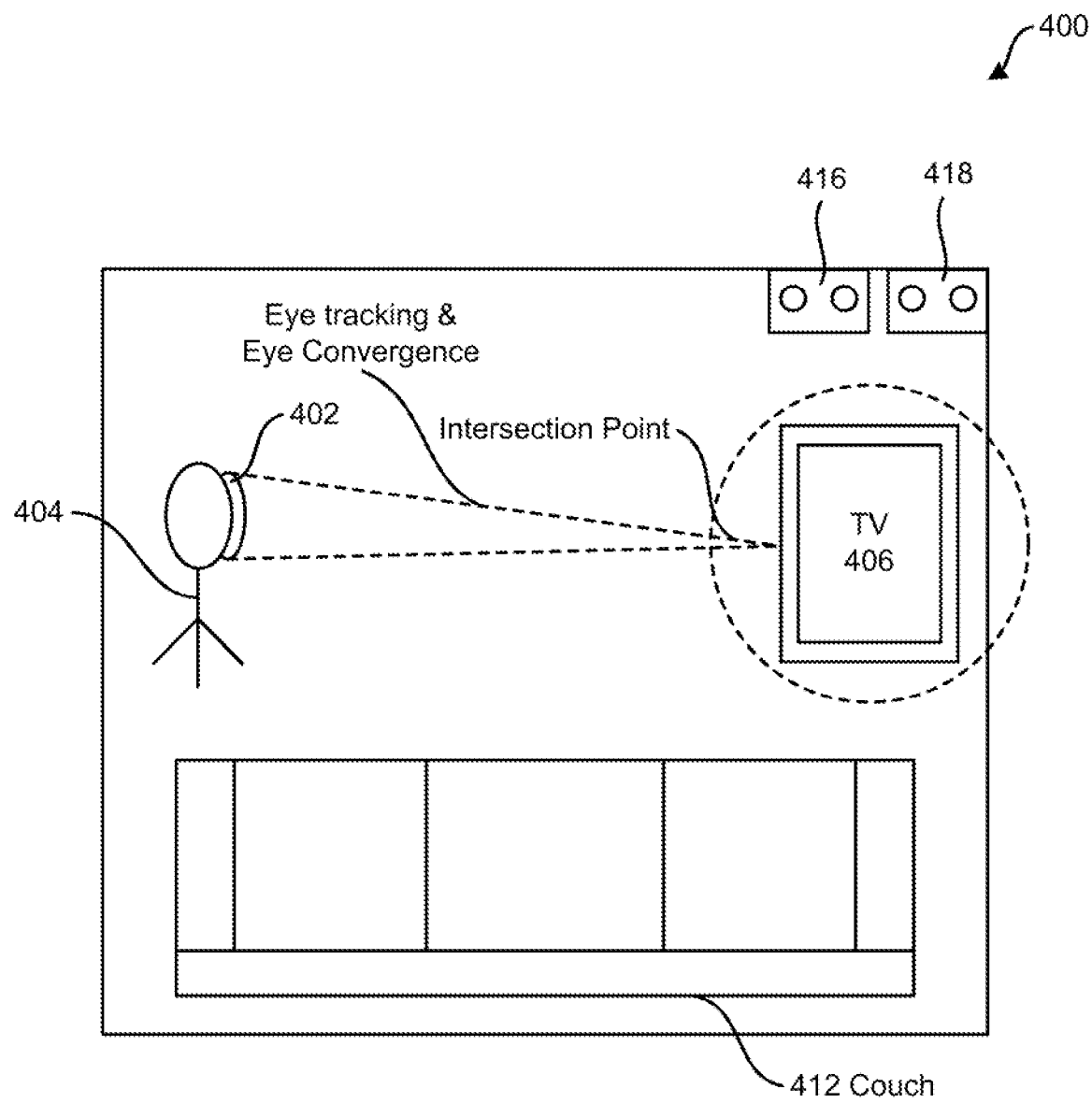
FIG. 4B illustrates eye tracking and eye gazing technique on a device that exist in the region of interest of the physical environment of the user.

FIG. 4B illustrates eye tracking and eye gazing technique on a device that exists in the region of interest of the physical environment 400 of the user 404. FIG. 4B shows a side perspective of FIG. 4A of the same living room 400. Considering a scenario, the user 404 is eye-gazing at something in the living room 400. The AR device 402 evaluates a gaze of an eye based on the pose of the AR device 402 and/or of the user 404, relative to the three-dimensional map. Similarly, a gaze of another eye of the user 404 associated with the line-of-sight within the three-dimensional map is determined for performing eye tracking. The gaze of both eyes of the user is associated with line-of-sight within the three-dimensional map. A region of interest in the 3D map is detected by computing eye gaze convergence for locating a spatial location of each of the devices and the objects in the region of interest. For example, in FIG. 4B shows the example of the eye gaze convergence of the user 404. The point where the eye gaze converges, the device and/or object detected that are around and/or within the radius of the intersection point of the eye gaze convergence. In an embodiment, the eye gaze convergence is computed by evaluating eye gaze vector elements intersecting at the physical device. In FIG. 4B, the user 404 is determined to be gazing at tv 406 when the TV unit 406 is detected within and/or around the radius of the intersection point of the eye gaze convergence. In such a case, the intent of the user 404 is to interact with tv 406. For example, by eye gazing at TV unit 406, the user 404 may say "Turn on". The process must turn on the TV unit 406. The user 404 may also use other IoT devices like "Alexa" or "refrigerator" through which the user may interact with TV. For example, the user 404 may say "turn on" to the refrigerator, and the refrigerator must instruct the TV to turn on itself to comply with the user's instructions for accessing and/or interaction. In this way, any of the IoT devices may be used as a medium through which the user may access and/or interact with the target device in the physical environment.

In some examples, where there may be multiple devices in the direction of the eye gaze of the user. In such scenarios, the confidence distribution score is used to determine which device the user is likely to interact with. For example, in the user's eye gaze direction, there may be smart plugs (416, 418), TV unit 406, and a smart lamp. However, the confidence distribution score of the TV unit 406 is higher than the confidence scores of the smart plugs (416, 418), and the smart lamp. Also, various other factors such as contextual signals that may include, but are not limited to, kinds of user intents for interacting with the physical objects or devices, kinds of commands detected based on previously issued commands of the user in the past, and based on other factors such as time of the day the user has interacted before or the user is likely to interact in present time, user behavior learned from previous actions or intents, or predicting user behavior in the present time, current state and historical state of both the user and the physical objects and/or devices, historical context semantics of the user intent for interaction, weather forecast information in the present time, past time or for the future time, default settings set for each physical object or device, priority scores associated with each physical object and/or device, different zones or regions of interest the user has shown specific priority or interest to interact, number of times of each of the contextual signals. In an embodiment, the confidence distribution score and each of the one or more contextual signals are correlated on another. For example, the confidence distribution score is evaluated based on each of the one or more contextual signals and each of the one or more contextual signals is updated based on the confidence distribution score. In particular embodiments, the machine learning models are updated based on the intent detected and the kind of interactions performed by the user 404 in all the instances along with updating corresponding contextual signals and associated confidence distribution scores of each intent and interactions.

FIG. 5A and FIG. 5B illustrate machine learning models 502 with the context of their use and functionality according to an embodiment. In particular embodiments, one or more machine learning models 132 are pretrained and trained over time regularly based on the output of each interaction and access from the user with various commands to the physical objects. For example, the machine learning models 502 are pre-trained before installation and are trained over time, periodically in different intervals and/or as per the user's instructions and settings and/or according to each user's experiences associated with the intent of accessing and interacting with any of the one or more devices and the one or more objects in the physical environment. Further, each of the machine learning models 502 is trained dynamically in real-time and automatically with or without the user's explicit commands to update certain intent or logs. Further, machine learning models 502 are trained during the configuration of the AR device (102 from FIG. 1A), and the computing system (114 from FIG. 1A) for determining the intent during each user experience in the physical environment. For example, the live streams, moving images or video footage, pictures, etc., that are received as one or more sensor data from digital still cameras, a digital moving image, or video cameras associated with the AR device 102 and/or associated with the computing system 114, are stored and used to train and update the machine learning models 132. In an embodiment, the machine learning models 502 are trained or retained based on updated one or more sensor data related to the live streams, moving images or video footage, pictures, etc., of a scene of the physical environment. In particular embodiments, the map generating engine 122 generating the artificial reality 3D object-centric map representation of the scene of the physical environment is used to train the machine learning models 502. All the physical objects including the one or more devices (e.g., smart and electronic devices), and the one or more objects other than the one or more devices (e.g., chairs, tables, light fixtures, people, other than smart and electronic devices) detected in a particular scene of the physical environment are also updated to the machine learning models 502 to prepare the ready-to-access and lookup of various 3D maps of the same scene in a similar context of the user experience. Features associated with each of the one or more devices, and the one or more objects detected in a particular scene of the physical environment, for example, physical, context, and semantic features, surface attributes, and data points associated with each physical object and other related features of each of the physical objects are updated to the machine learning models 502. For example, during object detection, various estimations such as depth estimation, size estimation, dimension segmentation, instance segmentation, the three scale-regression offsets for height, width, and length along with thickness estimation, and other related estimations, are carried out to evaluate the features associated with each physical object. Each estimation related to the 3D map generation is updated to the machine learning models 502 in each instance of the user experiences at regular intervals or dynamically in real-time. The spatial location data related to each of the physical objects are also stored and updated as virtual data to the machine learning models 502 dynamically in real-time. Any dynamic changes to the scene or zone or area of the physical environment that is detected during user experience and interactions are also used to update the machine learning models 502 to leverage computer intelligence or AI-based intelligence for automating the interaction with the user or predicting the automated interactions of the user in similar contexts that are similar or relatable to any present context. Furthermore, the object representations in the 3D map that are based on the 6DOF of the poses of the AR device 102 including the distance, and spatial locations of each physical object from the line of sight of the user along with vector values associated with each physical object are updated to the machine learning models 502.

In particular embodiments, the one or more machine learning models 502 are trained and updated dynamically in real-time based on the instructions of the user and one or more contextual signals. The instructions may be explicit (e.g., "turn on a light") or implicit (e.g., "where did I buy this"). For example, the implicit instruction may be based on determining the eye tracking and eye gazing process as well without referencing the physical device. The one or more contextual signals may include, but are not limited to, object instances state 504, historic state 506, and current state and context semantics 514 e.g., on or off modes, dim mode, bright mode, speed mode, buys mode, run mode, and various other states associated with the devices associated with the context of the user interaction, user behavior pattern 508 learned from previous actions or intents or predicting user behavior pattern 508 in the present time, pattern and context of user past commands 510, historical context and semantics 512, user forecast information 516, object identification data 518, different zones/regions of environment 520 the user has shown specific priority or interest to interact, time, day and duration data 522 the user has interacted before or the user is likely to interact in present time, weather forecast information 524 in the present time, past time or for the future time, updated 3D map representation (e.g., virtual representation of the physical environment) 526, etc. There may be other factors for training and updating the machine learning models 502 including, but not limited to, kinds of user intents for interacting with the physical objects or devices, kinds of commands detected based on previously issued commands of the user in the past, default settings set for each physical object or device, priority scores associated with each physical object and/or device, number of times of each of the factors stated above, and other related factors that are specific for interacting with various physical objects and/or devices including the factors used for training and updating the machine learning models. Additionally, training and updating the machine learning models leverage artificial intelligence for automatically determining such intent of the user in real-time and dynamically and/or for automatically predicting such intent of the user in real-time and dynamically.

In particular embodiments, the one or more machine learning models 502. For example, the commands with the intent to access and/or interact with the particular device may be determined in real-time and/or predicted using machine learning models, artificial intelligence, and other related techniques. The commands may include but are not limited to, any head gesture, hand gesture, voice gesture, finger taps, drag and drop movement, finger pinching, rotating movement, bloom gesture, resizing, selecting, moving, a natural language query, and any other kinds of AR-related commands to interact. In particular embodiments, the commands may be determined from the one or more controllers, pointers (e.g., mouse pointer or laser pointer), trackpad, one or more buttons, GUI-based elements, and other related components that are typically wearable or not wearable used for interacting with any of the one or more devices and the one or more objects. For example, the user can use a ring clicker or EMG wearable device, or a tablet providing a low-friction single-click interface.

In particular embodiments, the one or more machine learning models 502 are used for identifying predictive interfaces and the intent of the user through carrying out various predictive processes. The identification of the predictive interface is associated with various contextual signals updated over time corresponding to each user interaction, the confidence distribution score of the intent, and all the factors used for training and updating the machine learning models 502. For example, assuming there are four physical objects in the direction of the user's eye gaze, such as a TV, a table, a digital photo frame, and a smart lamp. An output of the machine learning model is associated with a probability and/or confidence distribution score of the user being interested in interacting with certain objects and devices, for example, 60% certain that the user likes to interact with the smart lamp because each time the user enters or present in the zone of the smart lamp during a particular time of the day, the user likes to either "turn on" or change the modes of the smart lamp to or from on/off mode. Similarly, probability and/or confidence distribution score with 30% certain that the user wants to interact with the lightbulb, and 20% with the TV, etc. In some examples, based on the higher confidence score estimated for the corresponding device and intent, the interaction is enabled. Another example, assuming there are five physical objects in the direction of the user's eye gaze, such as a thermostat, a TV, a table, a digital photo frame, and a smart lamp. Based on the earlier user behavior and patterns of interactions, it is determined that whenever the user sits on a couch, the user would like to watch the TV while turning on the thermostat to set the temperature. Setting the thermostat can depend on the weather forecast information as well, for example, if the weather is determined to be raining then the thermostat is set off. Another example, assuming there are newly identified people in the user environment, and from past settings and user patterns, the user changes the photos in the digital frame. Therefore, the likelihood of the user intent and the command to change the digital photo frame settings is identified based on detecting the user's head gestures or other kinds of gestures. Another example is, the machine learning models 502 learn the user's behavior and predicts which of the one or more devices and/or the one or more objects the user is likely to access and/or interact with, in similar contexts that are similar or likelihood with earlier contexts. For example, the machine learning models 502 learn that when the user uses a smartwatch in the kitchen, it is usually to set a timer. Next time, when the user is detected to be entering the kitchen during a particular time of the day or for some duration or with some food, the machine learning models 502 may predict to instruct the smartwatch to display the associated stopwatch app automatically for setting the timer or watch over the set timer while heating the food in the oven. In some examples, the user can issue a natural language query. For example, a side table is present around the location of the user and the user's eye gazes at that side table and utters "where did I buy this". The information and details of that side table are automatically provided to the user for viewing on a graphical user interface of any of the AR device 102 and/or one or more devices that are communicatively connected or associated with the computing system 114.

In particular embodiments, the one or more machine learning models 502 are trained and updated for identifying the intent of the user for interacting with the physical objects through localizing the user in the physical environment. In particular embodiments, the disclosure determines the intent of the user for interaction with one or more physical objects not only on the basis of eye tracking and eye gazing techniques but also on the user's location based. The intent detection engine 130 determines 1) a location of the user (localizing the user) in the present time, 2) objects and/or devices detected in a region of the physical environment around or proximal to the location of the user in the present time, 3) current state of both the user and objects and/or devices around or proximal to the location of the user. When user of artificial reality device 102 traverse throughout the physical environment, for example by moving throughout rooms or areas or floors or zones of a particular environment or house or building, etc., artificial reality device 102 must provide synchronized, continuous, and updated feature maps with low latency in order to provide a high quality, immersive, quick, seamless and enjoyable experience for users in accessing the three-dimensional map for the area as the user e4nter them while reducing the potential for latency and performance issues required for the interaction. A three-dimensional (3D) map is generated for a current region of interest where the user is located or where the user is in proximity to the current region of interest. Based on the three-dimensional map and location of the user, one or more representations of the physical objects including electronic devices and other objects different from those electronic devices (e.g., people toys, pillows, chairs, carpets, etc.) are localized and identified. The intent of the user is detected for enabling access and interaction with one or more physical objects in real-time dynamically based on the detected location of the user along with detection of the one or more devices and the one or more objects in the current region of interest. The intent of the user is accomplished by using any of the trained or updated machine learning models and/or explicit instructions including commands for interaction from the user and/or pre-set commands for such interaction. Additionally, the resulting interaction is also updated to one or more machine models 502 for using the updated kind of interactions in a similar context in the next similar instance automatically, dynamically, and in real-time. For example, when the user is determined to be in the kitchen and says, "turn on," such a command is detected to refer to the lights in the kitchen. Another example is, when the user is in the kitchen and uses a smartwatch, it is usually to set a timer. Next time, when the user is detected to be entering the kitchen during a particular time of the day or for some duration or with some food, it might be predicted or detected to instruct the smartwatch to display the associated stopwatch app automatically for setting the timer or watch over the set timer while heating the food in the oven.

In particular embodiments, the updates and trained information in the one or more machine learning models 502 are updated to confidence distribution score 528 corresponding to each device and object. Additionally, the updates and trained information in the one or more machine learning models 502 are updated to user intent prediction corresponding to each device and object for automatically detecting and/or predicting the intent of the user for interacting with the physical objects in the physical environment. As an example, the one or more machine learning models 502 are trained using supervised learning models.

Figure 6:
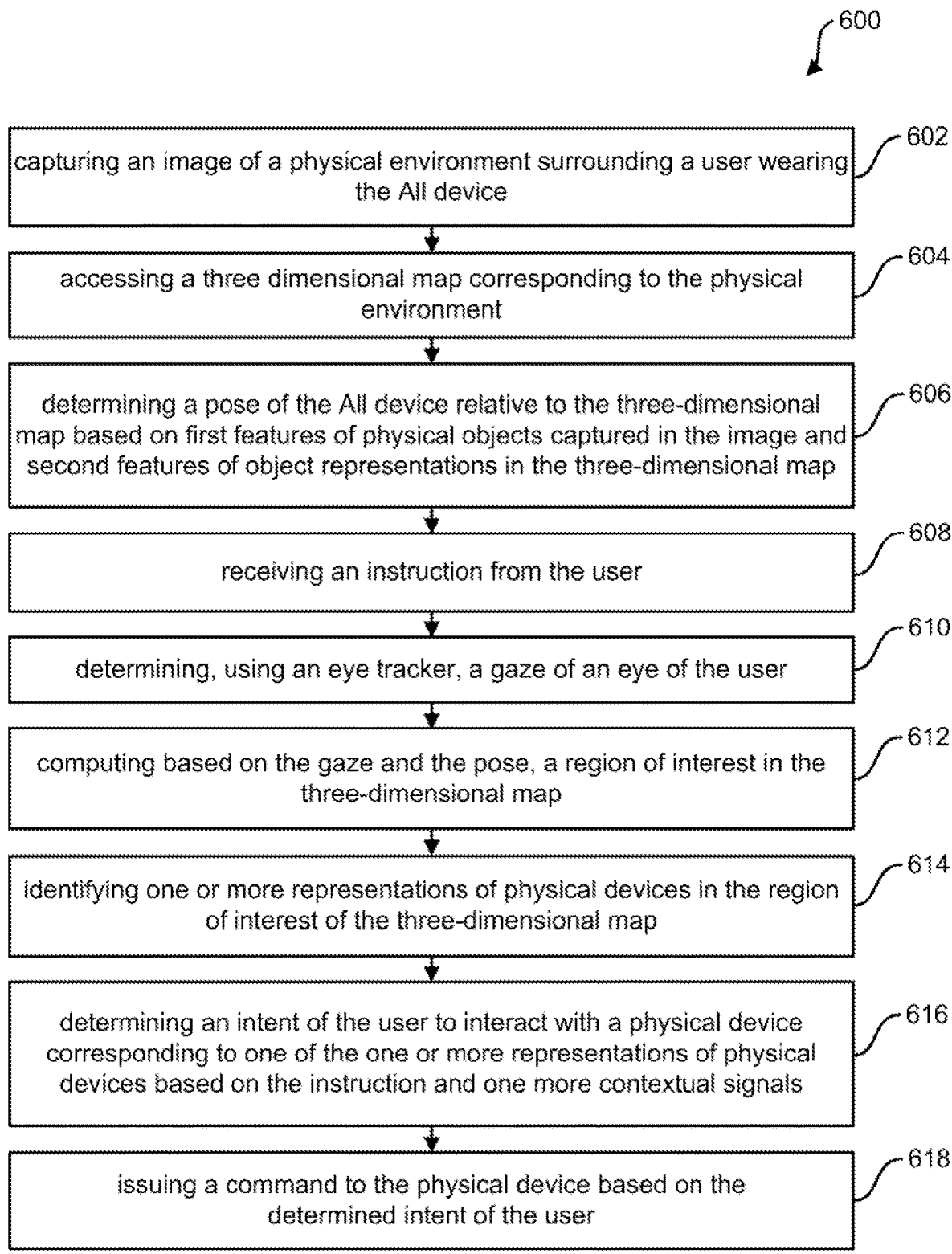
FIG. 6 depicts an example flowchart for determining the intent of users to interact with physical devices in the physical environment.

FIG. 6 depicts an example flowchart for determining the intent of users to interact with physical devices in the physical environment.

The method may begin at step 602, where a computing system (denoted 114 in FIG. 1A) is associated with an Artificial Reality (AR) 102 device. The computing system captures and/or receives an image of a physical environment surrounding a user wearing the AR device. For example, AR glasses provide stream sensor data in real time.

At step 604, the computing system accesses a three-dimensional (3D) map corresponding to the physical environment. In particular embodiments, a live and updating 3D object-centric map of the physical environment is accessed along with attributes or features of the physical objects including devices and other objects (e.g., chairs, people, tables, and non-electronic devices, etc.). All the physical objects are represented in 3D map representation where the physical objects are in line-of-sight of the user's gaze. The physical devices are at least one of the smart devices, smart units, and any internet-of-things (IoT) devices, and the physical objects are any objects different from the physical devices. The computing system is enabled to determine and access each attribute or feature of the physical objects. For example, the computing system may identify dynamically the light bulb as "the light above the cot" or a smart plug "the plug next to the kettle".

In particular embodiments, a 3D digital twin representation for each of the physical objects is determined in the physical environment (e.g., an apartment where the users there located). The generated 3D map is a high-fidelity 3D representation of the physical objects with geometry and appearance. The 3D map representation provides an actively controllable state for interfacing. For example, the 3D map representation is enabled with the ability to interface with an IoT device, to interface with the TV, or get the temperature of the fridge, or interface with a digital photo frame. Each object has a tracked position and orientation that is represented as 3D dynamic object with indexing using fiducial marker tracking. In an embodiment, each physical object and localizing the user in the physical environment is achieved using RGB, SLAMs, and IMUs in conjunction with the AR glasses and the computing system.

At step 606, the computing system determines a pose of the AR device relative to the three-dimensional map based on the first features of physical objects captured in the image and the second features of object representations in the three-dimensional map. The pose may be one or all of the 6DOF poses. From the pose(s), the spatial locations of each of the devices and the objects are determined and updated in the 3D map representation. Also, the location of the user as well is determined. In an embodiment, the pose of the AR device relative to the three-dimensional map is determined based on first features of physical objects captured in the image and second features of object representations in the three-dimensional map. The first features are the features and attributes of the physical objects that are in the line of sight of the user's gaze. The second features of the object representations of each physical device corresponding to the features in virtual representations that may include, a bounding box or pixel perfect in the three-dimensional map. The virtual representations of the virtual objects corresponding to the representation of the physical objects in a virtual manner in the 3D representation enable the computing system to detect the spatial location of each physical device. In an embodiment, the device and the objects which are at a predetermined distance from the line of sight of the user are identified and detected. For example, devices and objects that are located within 2 meters of distance from the user are located.

At step 608, the computing system may receive receiving an instruction from the user. The instructions may be explicit e.g., "turn on a light" or implicit e.g., "where did I buy this", "what are the dimensions", "what brand" or "where could I find different upgraded versions".

At step 610, the computing system uses eye tracking and eye gazing units for determining a gaze of an eye of the user. In an embodiment, all the captured image data, the detected physical objects along with their detected features and attributes, the user location, the geometry of the physical environment, the 3D map representation, and/or the user instruction are displayed on a screen associated with the AR glasses and/or the computing system (e.g. mobile phone), for example, on a right screen of the AR glasses. The computing system further computes the gaze of the eye of the user associated with the line-of-sight of the user within the three-dimensional map and further comprises determining a gaze of another eye of the user associated with the line-of-sight within the three-dimensional map for performing eye tracking.

At step 612, the computing system computes a region of interest in the three-dimensional (3D) map based on the gaze and the pose. The region of interest in the 3D map is based on the gaze and the pose is computed based on the user's eye gaze direction in the particular region of the physical environment. For example, from the user's eye gaze, it is determined that the user looking toward the direction of the living room where the TV, smart lamps, toys, couch and other plugs are installed or placed. In this way, the experience of being able to look at objects and select them to get information about them, in reality, is enabled for the user in real-time and dynamically by using real-time eye-tracking from tracked AR glasses devices. Further, real-time eye tracking leverages the user and the physical environment context and enables future lower friction interfaces in AR-related interaction and experience. For example, a time machine framework may be built with a process of using real-time SLAM, eye tracking, and object tracking together to render the current real-time visual state of the physical environment (e.g., apartment by using 3D object model and live state). In this way, the real spaces become part of the experiences through AR and mixed reality where the dense information of the user and the physical environment provide context for future AI.

At step 614, the computing system identifies one or more representations of physical devices in the region of interest of the three-dimensional map. In an embodiment, from the eye gaze of each eye of the user, the one or more representations of physical devices in the region of interest of the three-dimensional map may be identified. The one or more representations corresponding to virtual representation in the 3D map that depends on the eye gaze and poses of the AR device or the user. The identification of the one or more representations is achieved by computing eye gaze convergence for locating a spatial location of each of the physical devices in the region of interest and then detecting whether the physical device may be within and/or around a radius around an intersection point of the eye gaze convergence. The eye gaze convergence is computed by evaluating eye gaze vector elements intersecting at the physical device. For example, the eye gaze and poses may place the eye rays in the apartment frame of reference. Each device and object may be detected where the user is looking at or gazing at. Each device and object in the apartment are indexed which might exclude user(s) in some scenarios.

At step 616, the computing system determines the intent of the user to interact with a physical device corresponding to one of the one or more representations of physical devices based on the instruction and one or more contextual signals. The intent of the user to interact with the physical device and/or the objects is determined when the user gazes at that particular physical device and/or the objects.

At step 618, the computing system issues a command to the physical device based on the determined intent of the user. In an embodiment, the intent of the user to interact with the physical device through the command to the physical device may be any head gesture, hand gesture, voice gesture, finger taps, drag and drop movement, finger pinching, rotating movement, bloom gesture, resizing, selecting, moving, a natural language query, and any other kinds of AR-related commands to interact. For example, a natural language query may be "where can I buy this". The user may interact with the physical device through an implicit command that is based on the determining of the eye tracking without referencing the physical device and/or an explicit reference to the physical device. The user may also interact with the location of the user is detected at a particular region of interest and all the closer devices are detected. For example, based on the user pattern of past interaction, a particular type of interaction like "turning on the light" based on user's location detected in the kitchen or "switching off the tv" when the time is beyond 11 p.m. etc. or when the user leaves the tv area for a while. Other factors for determining the kind of interaction are based on pattern of the user's commands, user behavior pattern, historical context semantics, current context semantics, user forecast, and related pattern information, weather forecast information, and time of the day. In an embodiment, the computing system also detects predictive interfaces by using machine learning models as an option. For detecting predictive interfaces, the computing system determines a historic state relative to a present time and a current state including a location of the user at the present time. Then a region of interest of the user in the three-dimensional map is identified. Based on the region of interest, the intent of the user to interact with the physical device is predicted by evaluating a confidence distribution score associated with the physical device. The command is performed on the physical device based on the predicted confidence distribution score of the physical device.

Example of the eye gazing process for determining the intent of the user for interaction is illustrated herein. When the user looks at an object and then clicks on the object, the AR device or the computing system may lookup in the memory and display some information about that object. The process may also detect the intent when the user clicks on any dynamic object as well. In an embodiment, the user may interact using a tablet and a ring clicker for interacting with the smart plug. The user can put the ring on an index finger to click with a thumb. An EMG single-click may also used for clicking on any object for interaction. Upon clicking, the tablet becomes a 3D map generator (or Inspector) for generating the 3D object-centric map. The 3D map generator surfaces the attributes and live state for any physical object within the room and displays an overview or an inspector view showing the name and image of the object in addition to dynamic information to reflect the location of that object, the time the object was last seen, and the distance between the user and the object. By looking at the objects and clicking on the EMG wireless clicker, any object's information is viewable and accessed. For example, four items such as fridge, book, frame, and bed may in the direction of the user's eye gaze direction and the user may click on the book item. The 3D map generator displays additional information related to goals associated with that user when the user looks particularly at the book displaying additional information related to goals associated with that user like where the versions of that book are available and which stores might have them. For example, personalized information may also be displayed if an individual had a goal to eat healthily, and different information related to the fridge may be surface and displayed, compared with a person who has a goal to save money.

In particular embodiments, the explicit instruction and commands for interacting with the physical objects are disclosed. For example, when the user walks close to the lamp, gaze at the lamp & click, the lamp turns on or off. The user needs to walk closer to the lamp is associated with triggering the action explicitly to operate the lamp. The implicit triggering of action may include, for example, the user might hold a book and sit down on the sofa with the book in hand. The implicit command is associated with turning on the light automatically when the user sits down on the sofa. In an example, when the user sits down with a cup of coffee and is likely to watch TV. Sitting down on the sofa and having a cup in hand no longer turns on the light, but turns on the TV instead, which is based on specific settings, user behavior patterns, time of the day, confidence distribution score, or machine intelligence or artificial intelligence that turn on the TV on the fly and/or context of the scene the user is localized and the user's past interaction pattern with different kinds of objects. In a scenario where two people are having conversation in the TV area, then the TV is turned in this situation or pause the TV content from running. These settings are manually changeable or modified on the fly. However, the artificial intelligence may also automatically set these changes or later the consequences of the user's actions based on the user behavior and goals the user expects.

The disclosure relates to establishing a static indexer reflecting tracking of static objects and for tracking dynamic objects. Thus, any number of objects are tracked robustly to close the performance gap between static indexing techniques (e.g., optitrack) and markerless capabilities. The disclosure also relates to building a physically predictive dynamically updating representation of reality that may interface between the physical and digital worlds. In an embodiment, a method that allows to detection of general classes of objects in 3D, like all of the chairs in this room, without having to have specific training data for any particular chair or any particular room. The glasses are able to detect objects that have been detected for the first time and haven't been detected before. For example, when AR glasses are used for the first time at home, many objects in the home may be detected right out of the box. Further, many objects, for example, in an apartment, are manufactured items, and therefore it is possible to obtain a 3D model for each of the objects and store them in a library of objects. When 3D models are generated, additional information such as precise geometry, textures, and materials, etc. are also generated, that can detect objects and estimate their poses more precisely and more robustly.

Figure 7:
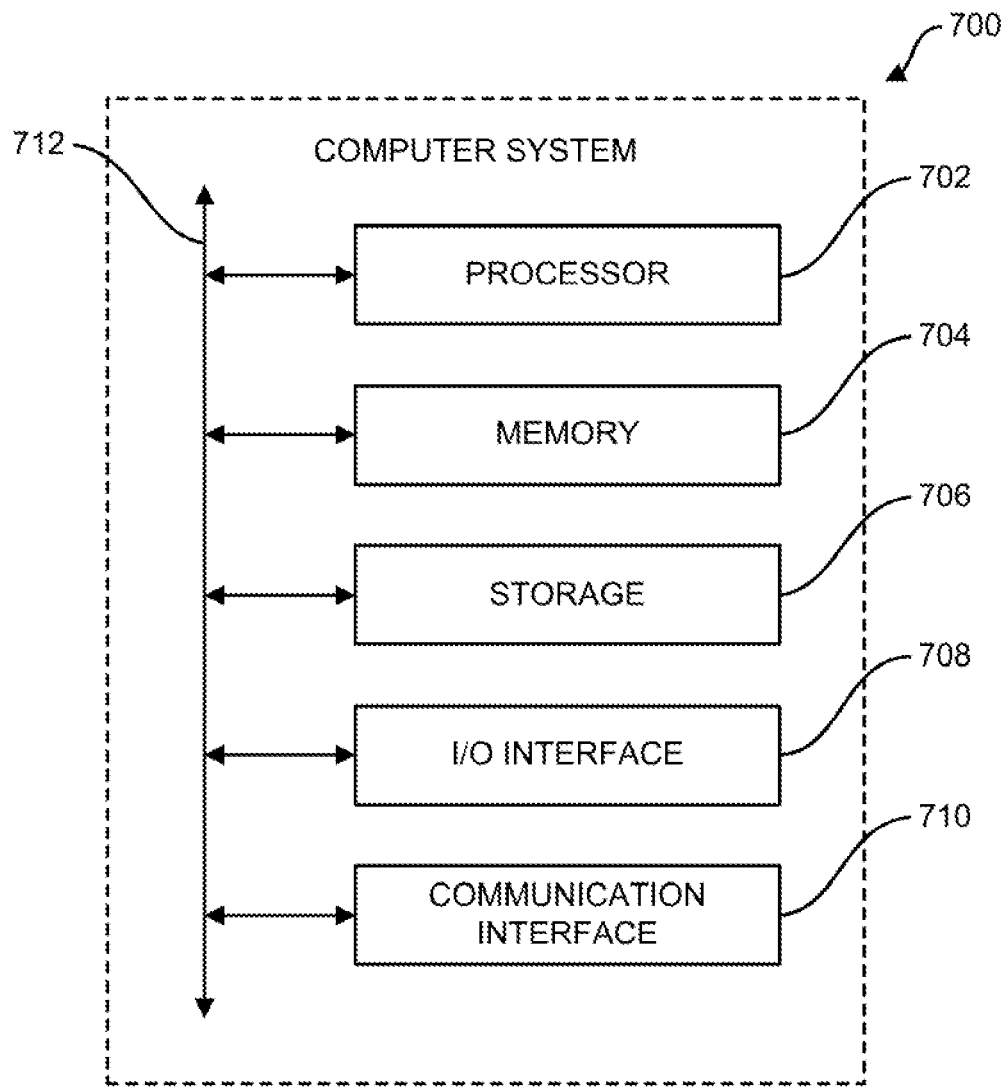
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with an Artificial Reality (AR) device:
    capturing an image of a physical environment surrounding a user wearing the AR device;
    accessing, at a computing device, a three-dimensional (3D) map corresponding to the physical environment;
    determining a pose of the AR device relative to the three-dimensional map based on first features of physical objects captured in the image and second features of object representations in the three-dimensional map;
    determining a historic state relative to a present time and a current state, the current state including a location of the user at the present time;
    receiving an instruction from the user;
    determining, using an eye tracker, a gaze of an eye of the user;
    computing, based on the gaze and the pose, a region of interest in the three-dimensional map;
    identifying one or more representations of physical devices in the region of interest of the three-dimensional map;
    assigning a confidence distribution score associated with a physical device corresponding to one of the one or more representations of the physical devices, based on at least one of the historic state and the current state;
    determining, by a machine learning model, an intent of the user to interact with the physical device based on the instruction, the confidence distribution score associated with the physical device, and one or more contextual signals; and
    issuing a command to the physical device based on the determined intent of the user.

2. The method of claim 1, wherein the gaze of the eye of the user is associated with line-of-sight within the three-dimensional map, and further comprises determining a gaze of another eye of the user associated with the line-of-sight within the three-dimensional map for performing eye tracking.

3. The method of claim 2, further comprising determining eye gaze of each eye of the user for identifying the one or more representations of physical devices in the region of interest of the three-dimensional map by:
    computing eye gaze convergence for locating a spatial location of each physical device in the region of interest; and
    detecting the physical device within a radius around an intersection point of the eye gaze convergence.

4. The method of claim 3, wherein the eye gaze convergence is computed by evaluating eye gaze vector elements intersecting at the physical device.

5. The method of claim 1, wherein the one or more representations of each physical device comprise a bounding box or pixel perfect in the three-dimensional map for detecting a spatial location of each physical device and based on a predetermined distance from a line-of-sight of the user.

6. The method of claim 1, wherein the physical devices are at least one of smart devices, smart units, and any internet-of-things (IOT) devices, and the physical objects are any of objects different from the physical devices.

7. The method of claim 1, wherein the instruction comprises any head gesture, hand gesture, voice gesture, finger taps, drag and drop movement, finger pinching, rotating movement, bloom gesture, resizing, selecting, moving, a natural language query, and any other kinds of AR-related commands to interact.

8. The method of claim 1, wherein the instruction comprises an implicit interaction that is based on the determining of the eye tracking without referencing the physical device and/or an explicit reference to the physical device.

9. The method of claim 1 further comprising detecting predictive interfaces by using a machine learning model by:
    predicting, from the machine learning model, a predicted intent of the user to interact with the physical device by evaluating the confidence distribution score associated with the physical device; and
    performing the command on the physical device based on the predicted intent of the user to interact with the physical device.

10. The method of claim 9, wherein the prediction of the intent of the user to interact with the physical device is further based on a pattern of user's commands, user behavior pattern, historical context semantics, current context semantics, user forecast, and related pattern information, weather forecast information, and time of the day.

11. A computer-readable non-transitory storage medium including instructions that, when executed by one or more processors of a computer system, are configured to cause the one or more processors to:
    capture an image of a physical environment surrounding a user wearing the AR device;
    access, at a computing device, a three-dimensional (3D) map corresponding to the physical environment;
    determine a pose of the AR device relative to the three-dimensional map based on first features of physical objects captured in the image and second features of object representations in the three-dimensional map;
    determine a historic state relative to a present time and a current state, the current state including a location of the user at the present time;
    receive an instruction from the user;
    determine, using an eye tracker, a gaze of an eye of the user;
    compute, based on the gaze and the pose, a region of interest in the three-dimensional map;
    identify one or more representations of physical devices in the region of interest of the three-dimensional map;
    assign a confidence distribution score associated with a physical device corresponding to one of the one or more representations of the physical device, based on at least one of the historic state and the current state;
    determine, by a machine learning model, an intent of the user to interact with the physical device based on the instruction, the confidence distribution score associated with the physical device, and one or more contextual signals; and
    issue a command to the physical device based on the determined intent of the user.

12. The media of claim 11, wherein the gaze of the eye of the user is associated with line-of-sight within the three-dimensional map, and further comprises determining a gaze of another eye of the user associated with the line-of-sight within the three-dimensional map for performing eye tracking.

13. The media of claim 12, wherein the instructions, when executed by the one or more processors of the computer system, are further configured to:
determine eye gaze of each eye of the user for identifying the one or more representations of physical devices in the region of interest of the three-dimensional map by:
computing eye gaze convergence for locating a spatial location of each physical device in the region of interest; and
detecting the physical device within a radius around an intersection point of the eye gaze convergence.

14. The media of claim 11, wherein the one or more representations of each physical device comprise a bounding box or pixel perfect in the three-dimensional map for detecting a spatial location of each physical device and based on a predetermined distance from a line-of-sight of the user.

15. The media of claim 11, wherein the instructions, when executed by the one or more processors of the computer system, are further configured to: detect predictive interfaces by using a machine learning model by:
predicting, from the machine learning model, a predicted intent of the user to interact with the physical device by evaluating the confidence distribution score associated with the physical device; and
performing the command on the physical device based on the predicted intent of the user to interact with the physical device.

16. An extended-reality (XR) headset comprising:
one or more processors; and
a computer-readable non-transitory storage medium in communication with the one or more processors and comprising instructions, that when executed by the one or more processors, are configured to cause the XR headset to:
capture an image of a physical environment surrounding a user wearing the XR headset;
access, at a communicatively coupled computing device, a three-dimensional (3D) map corresponding to the physical environment;
determine a pose of the XR headset relative to the three-dimensional map based on first features of physical objects captured in the image and second features of object representations in the three-dimensional map;
determine a historic state relative to a present time and a current state, the current state including a location of the user at the present time;
receive an instruction from the user;
determine, using an eye tracker, a gaze of an eye of the user;
compute, based on the gaze and the pose, a region of interest in the three-dimensional map;
identify one or more representations of physical devices in the region of interest of the three-dimensional map;
assign a confidence distribution score associated with a physical device corresponding to one of the one or more representations of the physical devices, based on at least one of the historic state and the current state;
determine, by a machine learning model, an intent of the user to interact with the physical device based on the instruction, the confidence distribution score associated with the physical device, and one or more contextual signals; and
issue a command to the physical device based on the determined intent of the user.

17. The XR headset of claim 16, wherein the instructions, when executed by the one or more processors, are further configured to cause the XR headset to: determine eye gaze of each eye of the user for identifying the one or more representations of physical devices in the region of interest of the three-dimensional map by:
computing eye gaze convergence for locating a spatial location of each physical device in the region of interest; and
detecting the physical device within a radius around an intersection point of the eye gaze convergence.

18. The XR headset of claim 16, wherein the one or more representations of each physical device comprise a bounding box or pixel perfect in the three-dimensional map for detecting a spatial location of each physical device and based on a predetermined distance from a line-of-sight of the user.

19. The XR headset of claim 16, wherein the physical devices are at least one of smart devices, smart units, and any internet-of-things (IOT) devices, and the physical objects are any of objects different from the physical devices.

20. The XR headset of claim 16, wherein the instructions, when executed by the one or more processors, are further configured to cause the system to: detect predictive interfaces by using a machine learning model by:
predicting, from the machine learning model, a predicted intent of the user to interact with the physical device by evaluating the confidence distribution score associated with the physical device; and
performing the command on the physical device based on the predicted intent of the user to interact with the physical device.

* * * * *